Patented Sept. 28, 1943

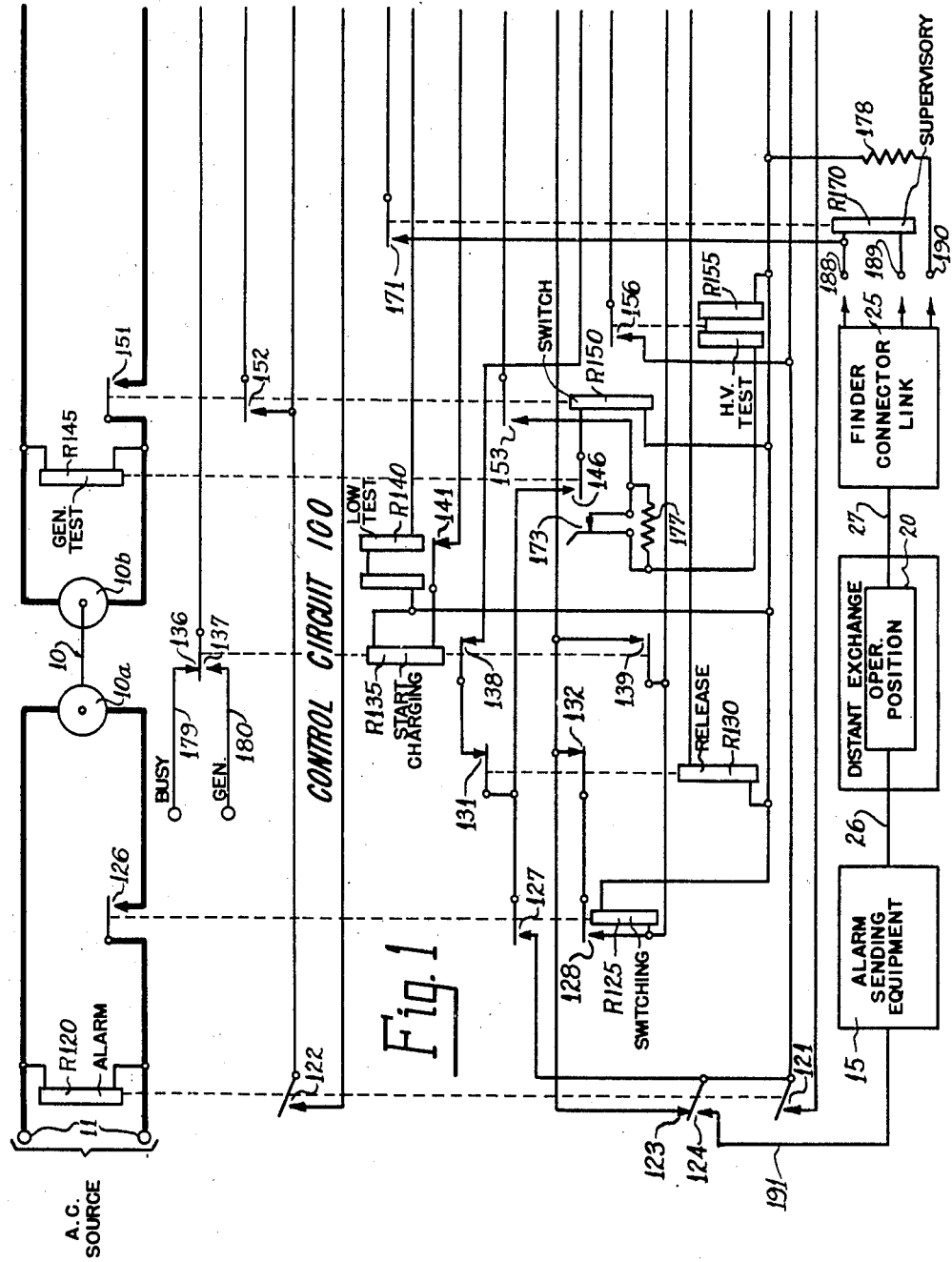

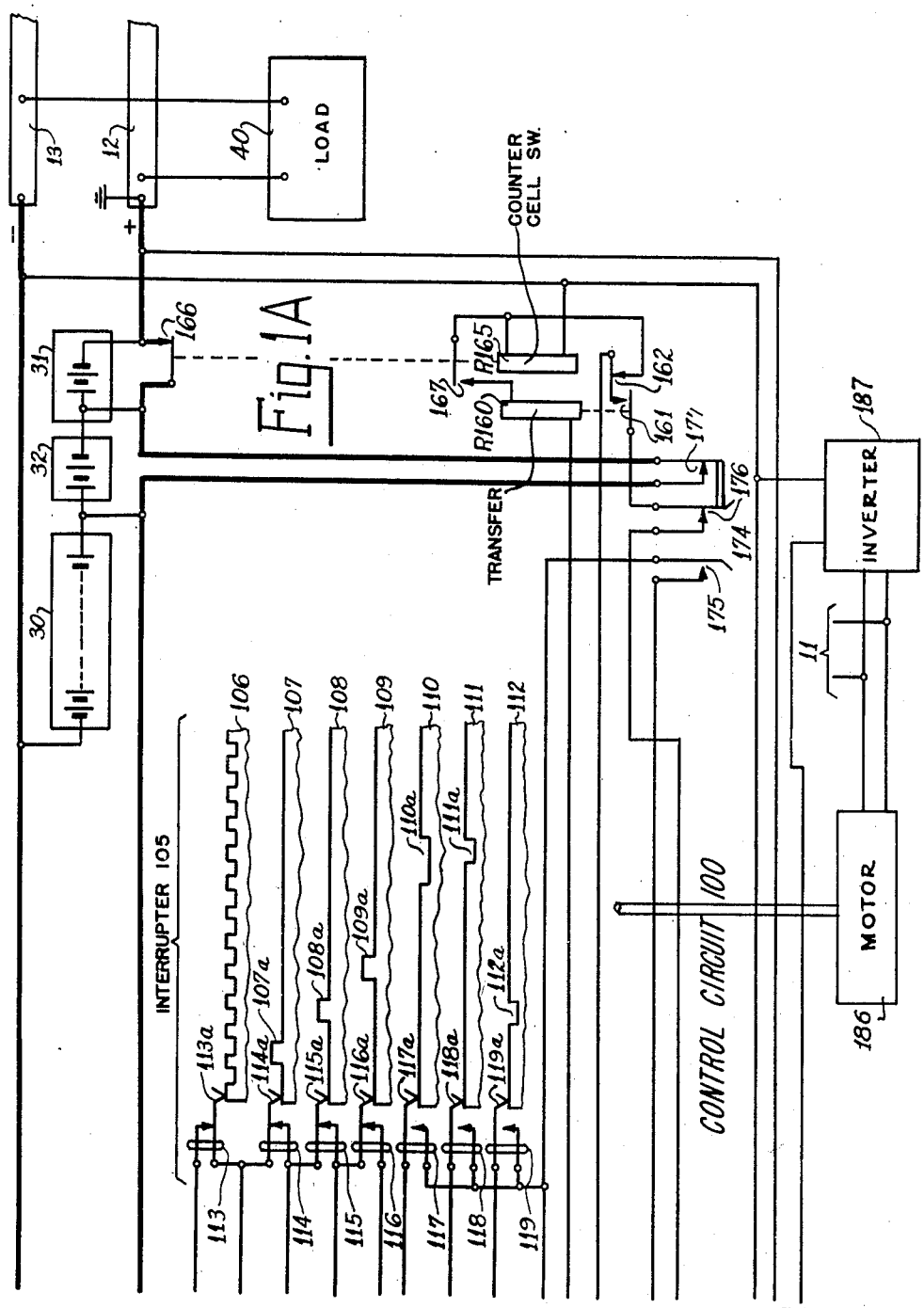

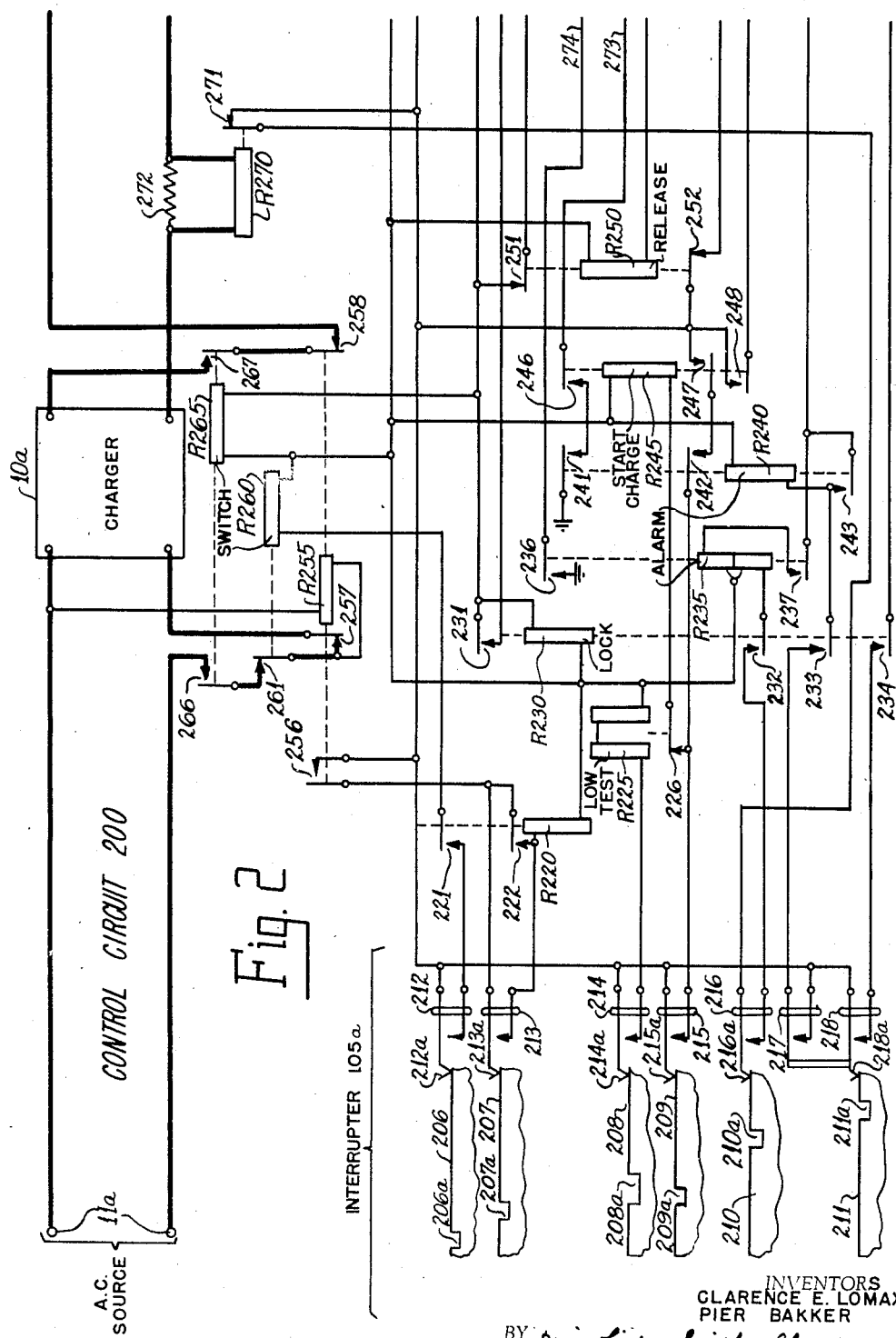

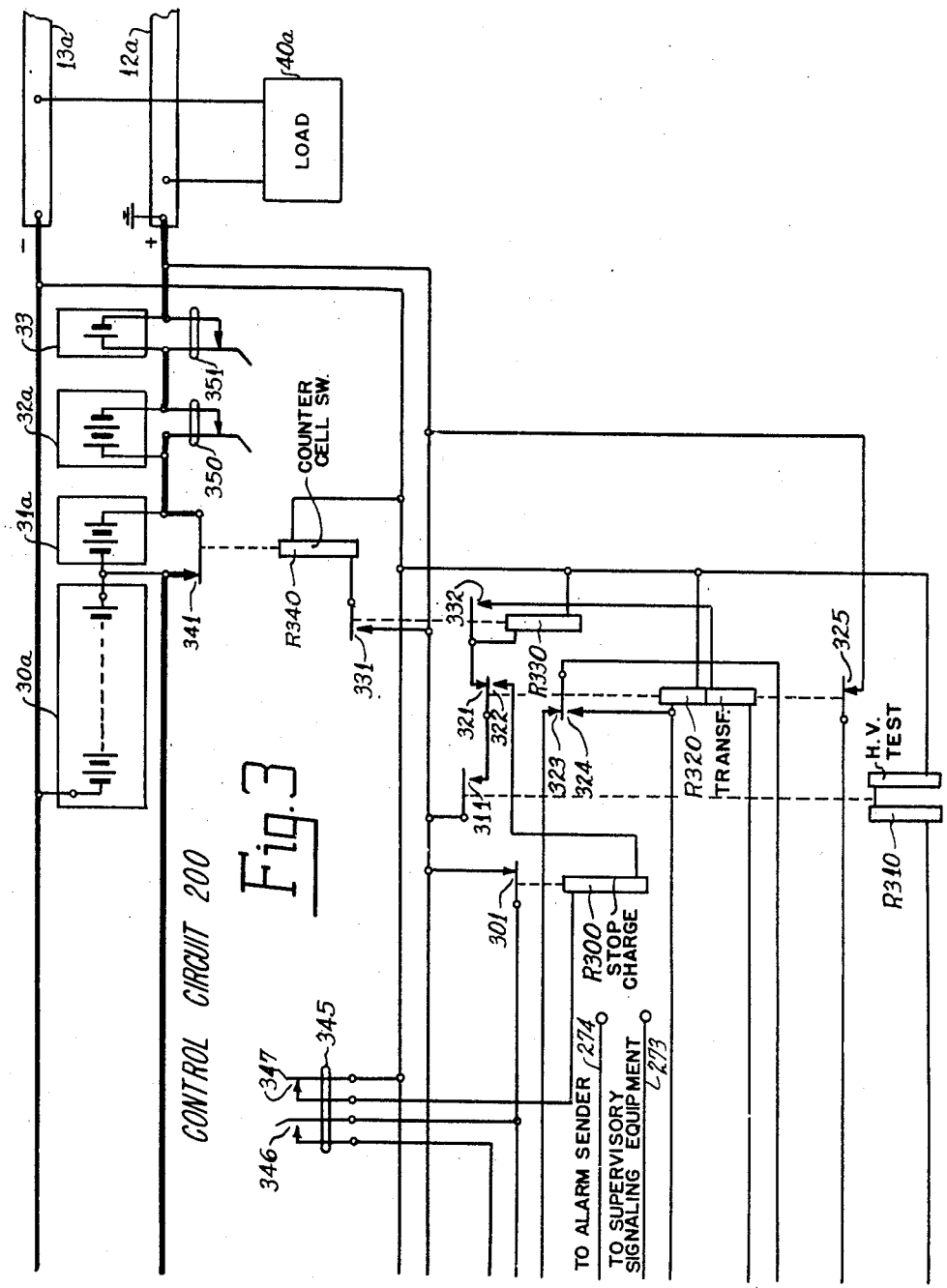

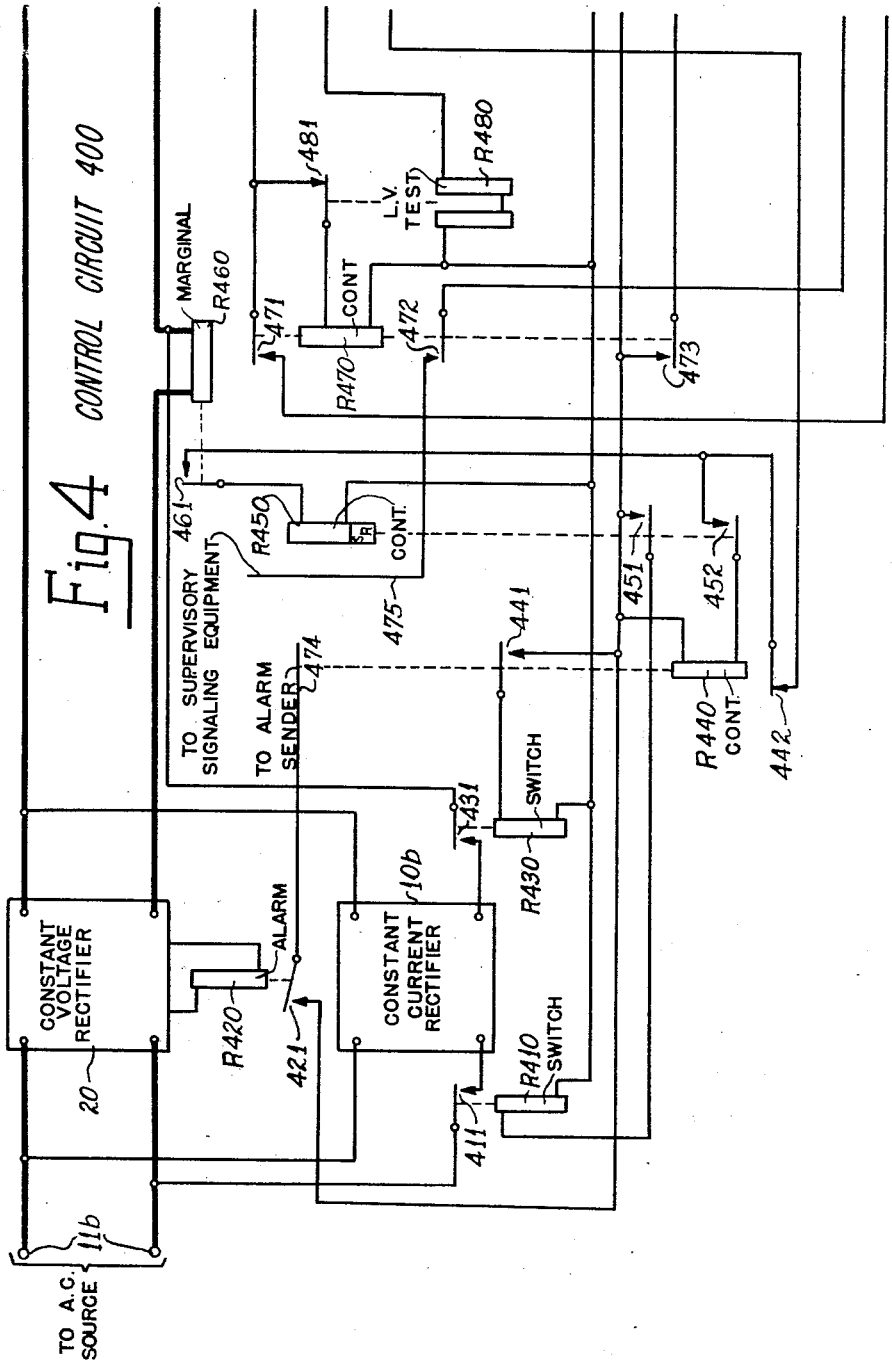

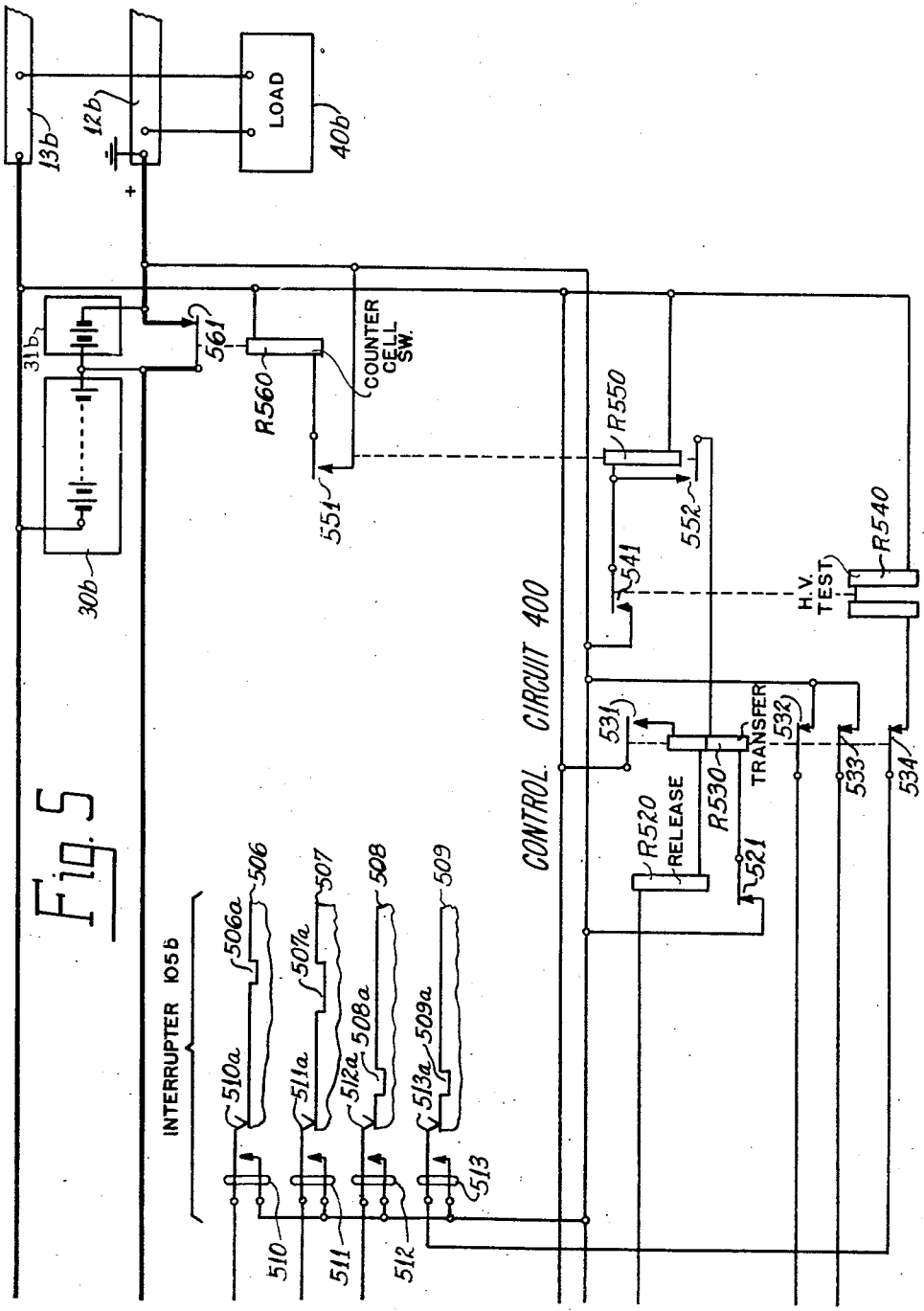

2,330,501

UNITED STATES PATENT OFFICE 2,330,501

CURRENT SUPPLY SYSTEM

Clarence E. Lomax, Oak Park, and Pier Bakker, Chicago, Ill., assignors to Automatic Electric Laboratories, Inc., a corporation of Delaware Application February 12, 1941, Serial No. 378,646

17 Claims. (Cl. 171—314)

The present invention relates to current supply systems and, more particularly, to improvements in supply systems of the character utilized in automatic telephone exchanges to supply direct current to the various relays, operating magnets and other control elements of the automatic switchgear. Current supply systems conventionally used in small unattended telephone installations of this character commonly include a unit which functions to convert alternating current of commercial frequency into direct current of the proper voltage, and a storage battery which is connected across the main bus conductors of the exchange and serves as an emergency supply source in case of commercial power failure, and also to supply current to the load during peak traffic periods when the current demand may exceed the current rating of the converter unit.

It is an object of the present invention to provide a current supply system of the character described which is arranged for complete supervision from a remote point, operates to maintain the switchboard voltage within limits satisfactory for reliable operation of the switchgear and also functions to provide improved switchboard reliability when the commercial power source fails.

It is a further object of the invention to provide a current supply system of the character described, wherein the control of the charging equipment is accomplished in a positive and reliable manner through the provision of charge testing apparatus which is fully automatic in character and is exceedingly simple in arrangement.

It is another object of the invention to provide a current supply system of the character described, wherein provisions are made for utilizing the same charge testing equipment for intermediate and high charge tests of the system battery.

It is another object of the invention to provide an improved system of the character described wherein the charge testing circuits are only periodically completed and wherein provisions are made for sustaining the operation of the charge testing equipment during periods of commercial power failure.

It is a further object of the invention to provide charge testing apparatus of the character just described, which is substantially non-responsive to sudden and momentary changes in the load imposed on the system but is faithfully responsive to sustained and substantial changes in the system load.

It is another object of the invention to provide a system including a charge testing circuit of the character described, wherein a source of counter E. M. F. is provided which is automatically included in and excluded from one of the test circuits in accordance with predetermined changes in the system voltage.

It is another object of the invention to provide a system of the character described, wherein provisions are made for altering the magnitude of the charge delivered to the system battery to conform to changes in the specific gravity of the battery occasioned by seasonal changes in the temperature of the battery.

It is another object of the invention to provide in a battery charging system utilizing a charger of the thermionic type an arrangement for protecting the charger against damage due to high voltage surges impressed upon the input circuit thereof.

It is still another object of the invention to provide in a battery charging system utilizing a charger of the thermionic type an arrangement for preventing flashbacks through the charger during periods when the charger is being connected to and disconnected from the system battery.

In each of the three illustrated embodiments of the invention there is provided a system which includes a battery and a charging or rectifying unit of the constant current type. The rectifying unit functions to deliver current to the switching equipment constituting the system load at all times when the load current is appreciable, and the battery functions primarily as a reserve current source that is utilized during peak load periods and in case of commercial power failure. In each embodiment of the invention the system battery is of the type commonly used in telephone exchanges and includes twenty-four cells having at least a 100 ampere hour rating. A battery of this character, when provided in a small exchange having a 5 ampere busy hour load, for example, has, when loaded, a voltage of substantially 48 volts when fully charged and the charging equipment is not in operation. Under normal conditions the total exchange carrying time of the battery is about 48 hours, and even though the busy period load is appreciably longer than that normally encountered in small exchanges, the system voltage is held at a value of 45 volts or more for a period in excess of 17 hours. This voltage is entirely satisfactory for satisfactory operation of the automatic switchgear provided in the exchange. In order to permit full charging of the system battery without an excessive rise in the system voltage during the final charging periods, a source of counter E. M. F. in the form of two counter cells is provided which is arranged to be serially included in one side of the supply circuit between the battery and the load. Automatic testing and switching apparatus is provided for switching the counter cells into and out of the current supply circuit and for starting and stopping the charging unit. This apparatus includes high and low voltage test relays which are periodically connected across the main current supply buses of the system. As thus connected, the low voltage test relay normally tests the voltage of the battery directly and controls the starting of the charging unit when the battery voltage drops to a predetermined value. With the charging unit operating, the high voltage test relay operates when the battery voltage attains a predetermined value and causes switching operations which result in the inclusion of the counter cells in the current supply circuit. With the system in this condition the high voltage test relay continues to test the system voltage which, in effect, constitutes a reference voltage that is less than the battery voltage by a substantially fixed amount, i. e., the voltage drop across the counter cells. When the system voltage again rises to the value required for operation of the high voltage test relay, the charging unit is stopped. Thereafter, and when the voltage of the battery is, due to the discharge thereof or to a heavy load imposed on the system, decreased to a value such that the low voltage test relay fails to operate, the counter cells are automatically excluded from the current supply circuit.

In accordance with another feature of the present invention a voltage dropping device in the form of a resistor or an additional counter cell is included in the high voltage test circuit. This device is normally short-circuited but provisions are made for opening the short-circuiting path to include the device in the test circuit, thereby to compensate for a change in the specific gravity of the battery occasioned by a seasonal change in the temperature thereof.

In one disclosed embodiment of the invention a constant voltage rectifier of the thermionic or dry disk type is provided which is operative to deliver current to the load and the battery at all times. A second normally inactive rectifier of the constant current type is also provided. In this embodiment of the invention the counter cell control equipment is utilized to cut the counter cells into and out of the current supply circuit in accordance with changes in the system voltage, in substantially the same manner as in each of the other disclosed embodiments of the invention. Additional equipment controlled in accordance with the magnitude of the system load is provided for starting and stopping the constant current rectifier. This additional equipment includes a timing device which functions to delay the completion of the constant current rectifier output circuit for an interval following the completion of the input circuit to this rectifier. The timing device also functions to delay the opening of the input circuit for an interval following the opening of the output circuit of the constant current rectifier during the operation of the control equipment to exclude this rectifier from the current supply channel.

Further features of the invention relate to the arrangement of the apparatus whereby the periodic testing of the system voltage is sustained during periods of commercial power failure and to the arrangement of the equipment whereby the charging unit is protected against high voltage surges appearing on the input circuit thereof.

The novel features believed to be characteristic of the invention are set forth with particularity in the appended claims. The invention, both as to its organization and method of operation, together with further objects and advantages thereof, will best be understood by reference to the specification taken in connection with the accompanying drawings in which Figs. 1 and 1A when laid end to end in the order named illustrate one embodiment of the invention, Figs. 2 and 3 when laid end to end in the order named illustrate another embodiment of the invention, and Figs. 4 and 5 when laid end to end in the order named illustrate a third embodiment of the invention.

Referring now more particularly to Figs. 1 and 1A of the drawings, the current supply system there illustrated may be provided in a small unattended exchange located in a community of limited population, and including trunking facilities to a distant central office which comprises an alarm or supervisory operator's position 20. The community exchange may, for example, comprise switching facilities terminating two hundred lines or less. These facilities preferably comprise finder-connector links of the well-known Strowger type. In order to facilitate a description of the mode of operation of the illustrated current supply system, a portion of the switching equipment provided in the community exchange has been illustrated in diagrammatic form. This equipment includes a finder-connector link 25 and alarm sending equipment 15 which terminates an alarm trunk 26 extending to the operator's position 20 in the distant central office. Through the equipment provided at this position the operator has access, over a trunk 27, to the automatic switching equipment of the community exchange.

Briefly described, the illustrated current supply system comprises a constant current rectifier unit in the form of a motor generator set 10, which is arranged to deliver direct current to a load 40 and also functions to charge the system battery 30. This rectifying unit preferably includes a generator 10b of the well-known compound wound type having a slightly drooping voltage characteristic. The alternating current motor 10a of the unit is arranged to receive current from the current supply terminals 11 which terminate opposite sides of a 110-volt alternating current feeder circuit. The storage battery 30 is normally connected across the system bus conductors 12 and 13 from which branch circuits extend to the component control elements constituting the load 40. In accordance with well established telephone engineering practice the positive bus conductor 12 is connected to ground. It will be understood that the load 40 is comprised of a large number of relay and magnet windings, lamps and other control elements, but for convenience in explaining the operation of the system these elements may be lumped together and considered as a load of variable resistance. As indicated in the introductory portion of the specification, the battery 30 is of the type conventionally used in telephone exchanges and comprises twenty-four series connected cells having a capacity of 100 ampere hours or more.

In order to stabilize the system voltage during periods when the charging unit 10 is connected to deliver current to the battery 30 and the load 40 in parallel, a source of counter E. M. F. in the form of a pair of series connected counter cells 31, each having a voltage of approximately 2 volts, is provided. Still further to stabilize the system voltage during those periods when the system battery 30 is being subjected to an equalizing charge, two additional series connected counter cells 32 are provided which are normally short-circuited through the contacts of the manually operable switch 174.

For the purpose of controlling the starting and stopping of the charging unit 10, and the inclusion of the counter cells 31 in the current supply circuit, a control circuit 100 is provided. Briefly described, this circuit comprises an alarm relay R120, a switching relay R125, a release relay R130, a start charging relay R135, a low voltage test relay R140, a generator test relay R145, a second switching relay R150, a high voltage test relay R155, a transfer relay R160, a counter switching relay R165 and a supervisory relay R170. The control circuit also includes an equalizing charge control key 174 and a test circuit control key 173, which latter key is provided selectively to include the resistor 177 in the high voltage test circuit.

For the purpose of controlling the circuit 100, an interrupter 105 of the cam-operated motor-driven type is provided. This device comprises a plurality of cams 106 to 112, inclusive, which are mounted for rotation on the same shaft, and are driven through a gearbox, not shown, by an alternating current motor 186. The driving motor 186 is normally energized from the alternating current feeder circuit extending to the terminals 11 but is arranged to be energized from the storage battery 30 through the inverter 187, in case the commercial current source fails. The inverter 187 may be of any desired commercial form, although preferably it is of the well-known mechanical type. The enumerated motor-driven cams have associated therewith contact springs 113 to 119, inclusive, which are provided to perform the control operations described with particularity hereinafter. In order clearly to show the relative positions of the actuating lobes and depressions provided in the cams, the portions thereof in which these lobes and depressions are formed have been shown in straight line form. It will be understood that the interrupter 105 is continuously operated to control the operation of the control circuit 100. Preferably the cams are operated at a constant speed of approximately thirty revolutions per hour.

In considering the operation of the sytsem illustrated in Figs. 1 and 1A of the drawings it may be assumed that the storage battery 30 is substantially fully charged so that the voltage across the twenty-four cells thereof is approximately 49.5 volts; the high voltage test relay R155 is constructed to operate when energized by a voltage of 52 volts; the low voltage test relay R140 is constructed to operate on any voltage exceeding 46 volts, and that appreciable although not excessive load current is being drawn from the battery 30. With these conditions present in the system the rectifying unit 10 is inactive and the counter cells 31 are short-circuited through the contacts 166 of the counter cell switching relay R165. Accordingly the voltage across the terminals of the storage battery 30 is the same as the voltage across the main bus conductors 12 and 13. Since the interrupter 105 is continuously operated, a test circuit is periodically completed over which the winding of the low voltage test relay R140 is bridged across the bus conductors 12 and 13. Thus each time the cam-follower portion 117A of the upper contact spring 117 drops into the depression 110a of the cam 110 a test circuit is completed which extends from the positive conductor 12 by way of the contacts 123, the springs 117 and the winding of R140 to the negative conductor 13. When energized in this circuit by a voltage exceeding 46 volts, the relay R140 operates and opens its contacts 141 to prevent the energization of the start charging relay R135 during the last half of the low voltage test period when the contact springs 118 are closed. It will be understood from the above explanation that the low voltage test relay R140 periodically operates and restores so long as the system voltage exceeds a value of 46 volts. As current is delivered to the load 40 from the storage battery 30, however, the voltage of this battery continues to drop until a value slightly less than 46 volts is reached. This decrease in the voltage across the bus conductors 12 and 13 may also be precipitated by a sudden and sustained increase in the load current. In any case, when the voltage across the conductors 12 and 13 drops to a value slightly less than 46 volts, the relay R140 is, during the next low voltage test period, insufficiently energized to operate. During the last half of this period the cam follower portion 118a of the upper contact spring 118 drops into the depression 111a to complete the prepared operating circuit for the start charging relay R135. This circuit extends from the positive conductor 12 by way of the contacts 123, the contact springs 118, the contacts 141, and the winding of R135 to the negative conductor 13. When thus energized the relay R135 immediately operates and closes its contacts 139 to complete an obvious circuit for energizing the switching relay R125. At its contacts 138, the relay R135 opens a point in the operating and locking circuits for the transfer relay R160. At its contacts 136, the relay R135 opens one of the supervisory signaling circuits described with particularity hereinafter. At its contacts 137, the relay R135 prepares another of the supervisory signaling circuits.

The switching relay R125, upon operating, locks up in a circuit including the bus conductors 12 and 13 and the contacts 128, 132 and 123. Thus the relay R125 is prevented from releasing when the contacts 118 are subsequently disengaged by the cam 111 to cause the deenergization and release of the start charging relay R135. In operating, the switching relay R125 closes its contacts 126 to complete an obvious circuit for delivering alternating current to the motor 10a, whereby operation of the rectifier unit 10 is initiated. As the motor generator set comes up to speed, the voltage across the output terminals of the self-excited generator 10b rises to a value sufficient to cause the operation of the marginal generator test relay R145. In operating, the relay R145 closes its contacts 146 to complete a circuit including the contacts 127 for energizing the switching relay R150. The relay R150, in operating, closes its contacts 151 to connect the output terminals of the generator 10b across the load 40 and the storage battery 30 in parallel. Thus the generator 10b is connected to deliver current to the load 40 and also to the battery 30, in the event the load current does not exceed the constant current rating thereof. At its contacts 152, the relay R150 completes an obvious path in shunt with the contact springs 114. At its contacts 153, the relay R150 prepares a high voltage test circuit over which the winding of the high voltage test relay R155 is periodically bridged across the bus conductors 12 and 13 by the interrupter 105.

After operation of the motor generator set 10 is initiated in the manner just explained, the voltage across the conductors 12 and 13 will almost immediately rise to a value exceeding 46 volts. Accordingly the periodic operation of the low voltage test relay R140, under the control of the interrupter 105, is again initiated. This relay, in operating, prevents the operation of the start charging relay R135 but performs no other function at this time.

As indicated above, the relay R150, in operating, prepares a test circuit over which the winding of the high voltage test relay R155 is bridged across the bus conductors 12 and 13. This test circuit is periodically completed by the cam 112 during each interval when the cam-follower portion 119a of the upper contact spring 119 is dropped into the depression 112a, and extends from the positive conductor 12 by way of the contacts 123, the contact springs 119, the contacts 153, the contacts of the key 173 and the winding of R155 to the negative bus conductor 13. So long as the voltage impressed across the winding of the relay R155 over this circuit does not exceed 52 volts this relay is insufficiently energized to operate. When, however, the battery 30 is sufficiently charged so that the voltage thereacross exceeds 52 volts, the marginal high voltage test relay R155 operates when energized in the above-traced test circuit. In operating, the relay R155 closes its contacts 156 to complete a circuit including the contacts 162 for energizing the counter cell switching relay R165. The relay R165 now operates and closes its contacts 167 to complete a path for short-circuiting the transfer relay R160, this path extending from the positive bus conductor 12 by way of the contacts 127, 131 and 138, the winding of R160, and the contacts 167, 162 and 156 back to the conductor 12. This path is interrupted at the contacts 156 in response to the release of the high voltage test relay R155 at the end of the high voltage test period in progress. When the short-circuiting path just traced is interrupted the two relays R160 and R165 are energized in series over a circuit which extends from the positive bus conductor 12 by way of the contacts 127, 131 and 138, the winding of R160, the contacts 167, and the winding of R165 to the negative bus conductor 13. The current traversing this circuit is sufficient to maintain the relay R165 operated and to cause the operation of the transfer relay R160. The transfer relay R160, upon operating, closes its contacts 161 to prepare the operating circuit for the release relay R130 and opens its contacts 162 further to interrupt the above-traced operating circuit for the counter cell switching relay R165.

In operating, the switching relay R165 also opens its contacts 166 to interrupt the path normally short-circuiting the counter cells 31. Thus the indicated counter cells are serially included in the connection between the positive terminal of the battery 30 and the positive bus conductor 12, whereby the voltage across the bus conductors 12 and 13 is decreased to a value approximately 4 volts less than the voltage across the terminals of the storage battery 30. In other words, the system voltage is lowered to a value of approximately 48 volts although the battery voltage is approximately 52 volts.

Following the operation of the relays R165 and R160 the interrupter 105 continues periodically to complete the previously traced high and low voltage test circuits. In this regard it will be noted that both of these circuits are connected across the bus conductors 12 and 13 rather than across the terminals of the battery 30. Accordingly the voltage periodically impressed across the high and low voltage test relays R155 and R140 is 4 volts less than the voltage across the terminals of the battery 30. If, with the system in this condition, a heavy load is imposed upon the system due to the start of the peak traffic period, for example, the voltage across the bus conductors 12 and 13 may be lowered to a value less than 46 volts, in which case the low voltage test relay R140 fails to operate when this test circuit is next completed. When this occurs, the start charging relay R135 is energized and operates during the last half of the low voltage test period. In operating, the relay R135 opens its contacts 138 to interrupt the previously traced series locking circuit for the two relays R160 and R165, causing these relays immediately to restore. In releasing, the relay R165 opens its contacts 167 to prevent the recompletion of the series locking circuit when the start charging relay R135 restores at the end of the low voltage test period in progress. At its contacts 166, the relay R165 again short-circuits the counter cells 31, thereby to equalize the voltage across the bus conductors 12 and 13 and the voltage across the terminals of the battery 30. Thus the voltage across the bus conductors 12 and 13 is increased by approximately 4 volts. From this point on, the testing operations continue in the manner explained above until the two relays R160 and R165 are again caused to operate due to an increase in the system voltage. This increase may be occasioned by a lightening of the load imposed upon the system or by an increase in the charge of the battery 30. When the relay R165 is again operated the counter cells 31 are again included in the connection between the positive terminal of the battery 30 and the bus conductor 12, so that the system voltage and hence the voltage periodically impressed across the test relays R140 and R155 is again 4 volts less than the voltage across the terminals of the battery 30. Assuming that the load conditions are maintained in a manner such that the battery voltage continues to rise due to the increased charge of the battery, the system voltage rises accordingly until a point is reached where the voltage across the bus conductors 12 and 13 exceeds a value of 52 volts. When this occurs the high voltage test relay R155 operates during the next succeeding high voltage test period and closes its contacts 156 to complete the prepared operating circuit for the release relay R130. This circuit extends from the positive bus conductor 12 by way of the contacts 156, 161 and 176 and the winding of R130 to the negative bus conductor 13. When thus energized the relay R130 operates and opens its contacts 131 to cause the deenergization and release of the relays R160 and R165. The relay R165, in restoring, opens its contacts 167 further to interrupt the series locking circuit for itself and the transfer relay R160, whereby these two relays are prevented from reoperating in response to the release of the two relays R155 and R130 at the end of the high voltage test period in progress. The relay R130, in operating, also opens its contacts 132 to interrupt the locking circuit for the switching relay R125. The relay R125 now restores and opens its contacts 128 further to interrupt its own locking circuit. At its contacts 127, the relay R125 opens the operating circuit for the relay R150. At its contacts 126, the relay R125 interrupts the circuit for energizing the motor 10a. Thus the operation of the motor generator set 10 is arrested. The relay R150, upon restoring, opens its contacts 151 to interrupt the circuit for delivering current from the generator 10b to the load 40 and the battery 30 in parallel. At its contacts 152, the relay R150 opens the path shunting the contact springs 114. At its contacts 153, the relay R150 interrupts the previously traced high voltage test circuit. Thus the system is restored to normal. It will be understood that the operations just described continue to occur in response to changes in the system voltage.

It is well known that batteries cannot be constructed so that all cells receive the proper amount of charge during regular daily charging cycles when incorporated in an installation of the character under consideration. The most convenient method of building up the charge on lagging cells is that of giving the entire battery an equalizing or overcharge. The accepted method of accomplishing this in telephone exchanges is to overcharge the exchange battery periodically, usually at intervals of approximately thirty days. If the equalizing charge is omitted from the system maintenance the exchange battery will become undercharged and cannot carry the desired load. Moreover, a short battery life will result. Conversely, if the daily charging cycles or float voltage is sufficiently high to prevent certain of the battery cells from lagging, the battery as a whole will be constantly overcharged, resulting in a short life. In equalizing the cell charge of the usual telephone battery from a constant current charger, the voltage at which the charge may be stopped, with assurance that all cells are fully charged, ranges from 2.25 to 2.9 volts per cell, depending upon the charging rate, the temperature of the battery, and other factors.

In the arrangement illustrated the two series-connected counter cells 32 are provided in the connection between the positive terminal of the battery 30 and the positive bus conductor 12 for the purpose of permitting an equalizing charge to be impressed upon the battery 30 without an undue rise in the system voltage. These counter cells are normally short-circuited through the contacts 177 of the key 174. When, however, it is desired to subject the battery to an equalizing charge a maintenance man operates the key 174, which is of the locking type, to its off-normal position wherein the contacts 175 are engaged and the contacts 176 and 177 are respectively disengaged. At the contacts 177, the path short-circuiting the counter cells 32 is interrupted, whereby the counter E. M. F. of these cells is included in the connection between the battery terminals and the bus conductors 12 and 13. Thus the system voltage is dropped approximately 4 volts below the voltage of the battery 30. At the contacts 176 a point is opened in the previously traced operating circuit for the release relay R130, thereby to prevent the high voltage test relay R155 from arresting the operation of the motor generator 10 when it is operated to indicate that the system voltage is above 52 volts. At the contacts 175 an alternative circuit is completed for energizing the switching relay R125, this circuit extending from the positive conductor 12 by way of the contacts 123 and 175, and the winding of R125 to the negative conductor 13. When thus energized the relay R125 operates to initiate the operation of the motor generator set 10 in the manner previously explained. Thereafter, and when the voltage of the generator 10b builds up to a value slightly exceeding the voltage across the battery terminals, the generator test relay R145 and the switching relay R150 are operated in the manner previously described. The latter relay, in operating, completes the high voltage test circuit including the winding of the relay R155 and closes its contacts 151 to connect the generator output terminals to the terminals of the battery 30. Thus the equalizing charge is started. As indicated above, with the key 174 in its off-normal position the high voltage test relay R155 may be operated to cause the operation of the two relays R160 and R165 in the manner previously explained, but is prevented from completing the operating circuit for the release relay R130. It will also be noted that when the counter cell switching relay R165 operates it opens its contacts 166 to interrupt the path short-circuiting the counter cells 31 so that an additional counter E. M. F. of 4 volts is inserted in the connection between the positive terminal of the battery 30 and the positive bus conductor 12. Thus the system voltage is dropped approximately 8 volts below that of the battery 30. It will also be noted that following the operation of the two relays R160 and R165, these two relays may be released under the control of the low voltage test relay R140 and the relay R135 if the system voltage drops below 46 volts. Thus, the counter cells 31 are, during the equalizing charge period, automatically included in and excluded from the connection between the positive battery terminal and the bus conductor 12 in response to predetermined changes in the system voltage. The switching relays R125 and R150 and the generator test relay R145, on the other hand, remain operated until the equalizing charge key 174 is manually restored to normal. Obviously, when this key is returned to its normal position, during a subsequent visit of the maintenance man to the exchange housing the equipment illustrated, the contacts 177 are engaged to complete the path for short-circuiting the counter cells 32. Thus the system voltage, i. e., that across the bus conductors 12 and 13, is increased by approximately 4 volts. At the contacts 175, the above-traced auxiliary operating circuit for the switching relay R125 is opened, thus restoring the control of this relay to the release relay R130. At its contacts 176, the previously mentioned operating circuit for the release relay R130 is reprepared. During the high voltage test period next succeeding the release of the equalizing charge key 174, the high voltage test relay R155 operates to complete the prepared operating circuit for the release relay R130. This relay, in operating, initiates the release of the switching relay R125, the transfer relay R160 and the counter cell switching relay R165 in the manner pointed out above. The switching relay R125, upon restoring, arrests the operation of the motor generator set 10, whereby the two relays R145 and R150 are caused to restore shortly thereafter. Thus the system is fully restored to normal.

In subjecting the battery 30 to an equalizing charge in the manner pointed out above, the charge is preferably started at about 12 M. of a working day. Based on traffic studies, the charges should, when started at this time, more than carry the load during the afternoon and evening of the same day. From about 10 P. M. until midnight the battery will receive a charge of from 33% to 66% of the constant current rating of the generator 10b. From midnight until 6 A. M. of the following day the battery will receive even more charging current. At about 6 A. M. the exchange load should start to increase, thus again reducing the charging rate effectively to taper the equalizing charge. If the maintenance man who starts the equalizing charge revisits the exchange to stop the charge at 8 A. M., for example, a lower charging rate will thus be utilized during the last two hours of the equalizing charge. This decrease in the rate of charge at the end of the equalizing charge tends to avoid an unduly high battery voltage at the end of the charge.

Telephone exchange batteries which are commercially available in the art are open to the criticism that when the temperature thereof is dropped to a low value it is necessary to charge the batteries to a higher voltage in order to maintain the correct specific gravity thereof. In small unattended exchanges this is a decided disadvantage since usually the exchange building in which the equipment is housed constitutes an unheated enclosure which is subject to seasonal temperature changes. Accordingly, it is desirable in installations of this type to provide facilities for changing the charge cut-off voltage to compensate for seasonal changes in the temperature of the battery. It is to this end that the resistor 177 is provided which may be included in the test circuit over which the high voltage test relay is periodically bridged across the bus conductors 12 and 13. In the operation of the system this resistor is short-circuited through the contacts of the key 173 during the summer months when the temperature of the battery is substantially normal. During the winter months, however, the key 173 is maintained in its off-normal position, wherein the contacts thereof are disengaged serially to include the resistor 177 in the high voltage test circuit. As a consequence, a higher voltage between the bus conductors 12 and 13 is required to cause the operation of the high voltage test relay R155. Hence the battery voltage at which each charging operation is arrested under the control of the high voltage test relay R155 is increased, as will be clearly apparent from the preceding explanation. The magnitude of this increase in the charge cut-off voltage is, of course, dependent upon the resistance value of the resistor 177. If the value of this resistor is properly chosen, a charge cut-off voltage may be obtained which is correctly related to the average seasonal drop in temperature of the particular location in which the battery 30 is installed.

In the normal operation and maintenance of the system an operator attending the supervisory position 20 is assigned the duty of periodically checking the condition of the power and supervisory equipment provided in the community exchange and including the current supply system just described. To this end, the operator attending the position 20 may seize one of the links provided in the distant community exchange. Assuming that the finder-connector link 25 is seized, the usual dial tone signal is transmitted therefrom over the trunk 27 to the headset of the operator attending the position 20 when the finder of the link switches the calling trunk 27 through to the connector portion of the link. This statement is predicated on the assumption that the dial tone generator provided in the community exchange is operating properly. In this regard it will be appreciated that if the calling operator fails to hear the dial tone signal she is informed that the dial tone generating equipment or certain of the dial tone circuits are out of order. Upon receiving the dial tone signal the operator may cause the wipers of the connector switch in the link 25 to be positioned on the test contacts 188 to 190, inclusive, by dialing the directory number assigned to this contact set. After the test contacts are thus selected the usual line busy test operation occurs in the control equipment of the link. If the test contacts are idle, the usual switch-through operation occurs in the link 25, whereby ground potential is impressed upon the private contact 190 and a circuit including the positive and negative line wipers of the connector switch and the winding of the supervisory relay R170 is completed for energizing the ring cut-off relay conventionally embodied in the connector portion of the link. When thus energized the ring cut-off relay operates to establish a signaling circuit which extends from the headset in use at the operator's position 20 through the link 25 to the selected test contacts. The supervisory relay R170 also operates when energized in this circuit and closes its contacts 171 to complete a circuit for transmitting signals through the link 25 and over the trunk 27, indicative of the condition of the power and supervisory equipment provided in the community exchange.

The character of the signal transmitted to the supervisory operator depends upon a number of significant factors. Thus, if the current supply system illustrated is in its normal condition as described above and the busy tone generating equipment is operating properly, separate pulses of interrupted busy tone current are transmitted over the established signaling circuit. Under the conditions stated the path traversed by this current may be traced as extending from the ungrounded terminal of the busy tone generator, not shown, by way of the busy tone lead 179, the contacts 136, the series-connected contact springs 113, 114, 115 and 116, the contacts 171, the line contact 188, and the negative line wiper of the connector switch. From this point the busy tone current is transmitted through the link 25 and over the trunk 27 to energize the receiver of the headset in use at the operator's position 20. It will be noted that this branch of the signaling circuit is continuously and rapidly interrupted due to the separation of the contact springs 113 under the control of the cam 106. It will also be noted that the above-traced branch of the signaling circuit is successively interrupted at the contact springs 114, 115 and 116 due to the successive engagement of the projections 107a, 108a and 109a with the cam-follower portions 114a, 115a and 116a, respectively, of the upper contact springs 114, 115 and 116. The latter interruptions in the signaling circuit constitute spacing intervals in the signal transmitted and each spacing interval is of significance in the operator's translation of the signal. Thus it will be noted that a long uninterrupted signal is produced following the successive separation of the contacts 114, 115 and 116. The operator is informed by counting the three spacing periods which follow the long uninterrupted signal that the current supply system is in normal condition and that the charging unit is not in operation. She is also informed by the tone of the signal, as derived from the busy tone generator, that this generator is operating. If at any time during the test period, the start charging relay R135 momentarily operates to initiate the operation of the charging unit 10, in the manner previously explained, the contacts 136 are momentarily opened and the contacts 137 are momentarily closed, whereby the signaling current is, for a short interval, derived from the ringing current generator, not shown, over the lead 180 rather than from the busy tone generator. The reproduction of this splash of ringing current by the receiver provided at the operator's position 20 serves to inform the operator that the ringing equipment is in proper working order.

It will be noted that if the start charging relay R135 is operated and the two relays R145 and R150 fail to operate a complete signal comprising three spacing intervals is transmitted to the operator. Under normal conditions the generator test relay R145 and the switching relay R150 operate shortly following the operation of the start charging relay R135. Accordingly if the three-spacing-period signal is reproduced by the receiver in use at the operator's position 20 for a sustained period following the reproduction of the splash of ringing current, the operator is informed that a fault exists in the charging unit 10. On the other hand, if the switching relay R150 operates in the manner explained above, it closes its contacts 152 to short-circuit the springs 114. Accordingly, the separation of the contacts 114 by the cam projection 107a is ineffective to produce a spacing interval in the signal when the relay R150 is operated. This, of course, means that only two spacing intervals are included in the signal transmitted to the operator's position 20. Thus the operator is informed that the charging unit 10 is in operation, and that the voltage of the battery 30 is low. Moreover, if the voltage of the battery remains low after operation of the charging unit 10 is initiated, the relay R135 continues its periodic operation and functions to transmit a splash of ringing current over the signaling circuit during each long period separating the spacing intervals. This recurrent ringing signal and the termination thereof when the battery voltage exceeds 46 volts, serves to inform the operator as to the charging interval required to remove the low voltage condition. When a signal is received indicating that the charging unit is operating, the operator may, by successive test calls at spaced intervals, ascertain whether or not the charging operation is completed within a reasonable time interval. In this regard it will be understood that when the charging operation is completed the relays R135 and R150 are restored so that the normal busy tone signal comprising three spacing intervals is transmitted over the signaling circuit.

Provisions are made for transmitting an emergency alarm signal to the operator's position 20, for example, in the event the alternating current source fails. Thus if the feeder circuit extending to the terminals 11 is interrupted or otherwise deenergized, the normally energized alarm relay R120 restores. In releasing, this relay closes its contacts 122 to shunt the contact springs 115. At its contacts 123, the relay R120 opens a point in the common portion of the operating, test and locking circuits for the relays R125, R135, R140 and R155. Thus any operated ones of the relays provided in the control circuit 100 are immediately deenergized and restore in response to the release of the alarm relay R120. As a result, the current drain from the storage battery 30 is substantially reduced. At its contacts 121, the relay R120 completes a circuit for energizing the inverter 187. If this inverter is of the mechanical interrupter type, the start circuit therefor extends from the negative conductor 13 through the winding of the start relay embodied in the interrupter, and the contacts 121 to the positive conductor 12. When the start relay of the interrupter is thus energized, the interrupter operates to deliver alternating current to the motor 186, whereby operation of the interrupter 105 is sustained. At its contacts 124, the relay R120 completes an obvious path for impressing ground potential upon the alarm lead 191. When this lead is grounded the alarm repeater operates in a well-known manner to establish a calling circuit over the trunk 26. The completion of this circuit results in the energization of a signal lamp provided at the operator's position 20. The operator, upon observing the lighted condition of this lamp, is informed that a fault exists in the equipment provided at the distant community exchange. To determine the character of the fault she may route a test call to the test contacts 188, 189 and 190 in the manner just explained. In this case the signal which is transmitted to the operator's position 20 comprises only two spacing intervals which are separated by a relatively long interrupted busy tone signal. Thus with the contacts 122 engaged, the disengagement of the contact springs 115 by the cam projection 108a is ineffective to produce a spacing period in the signal. Accordingly the two spacing periods produced by the successive separation of the contact springs 114 and 116 are relatively widely spaced. This wide separation between the two spacing periods serves to inform the operator at the position 20 that alternating current power source has failed in the distant community exchange.

From the foregoing explanation it will be apparent that a wide variety of distinctive signals are transmitted to the supervisory operator's position 20 in an exceedingly simple manner with a minimum of equipment. It will also be understood that the operator upon receiving any signal indicating a fault in the distant community exchange may take the proper steps to see that the fault is corrected. Thus if a signal is received indicating that the feeder circuit extending to the terminals 11 is deenergized, the operator may call the power company and request that the fault be corrected. If a signal is received indicating that certain of the equipment in the community exchange is not in proper working order the operator may dispatch a maintenance man to the exchange for the purpose of correcting the fault, and she may give rather detailed information as to the character of the fault.

Referring now more particularly to Figs. 2 and 3 of the drawings, the current supply system there illustrated is essentially similar to that shown in Figs. 1 and 1A, with the exception of the apparatus for controlling the charging unit and the switching of the counter cells. In order to indicate the similarity between the two systems the same reference numerals have been used to identify corresponding parts. In the arrangement illustrated in Figs. 2 and 3 an additional counter cell 33, normally short-circuited through the contacts of the switch 351. is provided in lieu of the resistor 177 used in the system of Figs. 1 and 1A. The charging unit 10a is preferably of the constant current thermionic or dry disk type. In this system a control circuit 200 is provided for starting and stopping the rectifier 10a and for controlling the counter cell switching. Briefly considered, this control circuit comprises a low voltage test relay R225, a locking relay R230, a pair of alarm relays R235 and R240, a switching relay R265, a start charging relay R245, a release relay R250, a stop charging relay R300, a high voltage test relay R310, a transfer relay R320, a control relay R330, and a counter cell switching relay R340. Three additional relays R220, R255 and R260 are provided which function to protect the rectifier 10a against damage due to high voltage surges impressed across the input terminals 11a. For the purpose of controlling the alarm sending relay R235 to indicate a failure of the rectifier 10a, another relay R270 is provided which is bridged across a resistor 272 included in the connection extending from the positive output terminal of the rectifier 10a to the positive terminal of the storage battery 30a. The control circuit 200 also comprises an equalizing charge key 345 which, in conjunction with the knife switch 350, is utilized to condition the system for an equalizing charge of the storage battery 30a. All of the relays mentioned above are arranged to be controlled by a continuously operated motor driven interrupter 105a of the cam-operated type which is substantially similar in construction with the interrupter 105 provided in the system shown in Figs. 1 and 1A. In the system illustrated in Figs. 2 and 3, the inverter for energizing the driving motor of the interrupter 105a during periods of alternating current failure, the alarm sending equipment and the alarm signaling circuits have not been shown, but it will be understood from the above explanation how these features of the circuits illustrated in Figs. 1 and 1A of the drawings and described with particularity above may be incorporated in the system of Figs. 2 and 3.

In considering the operation of the system it may first be assumed that the rectifier 10a is not operating; the battery 30a is charged to a voltage of approximately 48 volts; the low voltage test relay R225 operates on any voltage exceeding 46 volts, and the high voltage test relay R310 operates on any voltage above 52 volts. With the system in this condition current is supplied to the load 40a from the battery 30a and the low voltage test relay R225 is energized and operates at two-minute intervals for low voltage test periods of ten second duration each, under the control of the interrupter 105a. Thus during each revolution of the cam 208 the cam-follower portion 214a of the upper contact spring 214 drops into the depression 208a so that the contact springs 214 are moved into engagement to bridge the relay R225 across the bus conductors 12a and 13a. This periodically completed low voltage test circuit extends from the positive bus conductor 12a by way of the contact springs 214 and the winding of R225 to the negative bus conductor 13a. So long as the system voltage, i. e., the voltage across the conductors 12a and 13a, exceeds 46 volts the low voltage test relay R225 operates each time the circuit just traced is completed. In operating, the relay R225 opens its contacts 226 to interrupt the operating circuit for the start charging relay R245 and thus prevent the latter relay from operating during the last half of each low voltage test period. Immediately the voltage of the storage battery 30a drops below a value of 46 volts, the low voltage test relay R225 fails to operate during the next succeeding low voltage test period. During the last half of this test period the cam-follower portion 215a of the upper contact spring 215 drops into the depression 209a to complete the prepared operating circuit for the start charging relay R245. This circuit extends from the positive conductor 12a by way of the engaged contact springs 215, the contacts 226 and the winding of R245 to the negative conductor 13a. When thus energized the relay R245 operates and closes its contacts 246 to prepare a path for impressing ground potential upon the supervisory lead 273. At its contacts 247, the relay R245 prepares a locking circuit for itself. At its contacts 248, the relay R245 completes a circuit for energizing the relays R230 and R265 in parallel, this circuit extending from the positive conductor 12a by way of the contacts 248, 323 and 251, and the parallel connected windings of the relays R230 and R265 to the negative conductor 13a. When thus energized the relay R230 operates and closes its contacts 232 and 233 to prepare the operating circuits for the alarm relays R235 and R240. At it contacts 234, the relay R230 prepares the high voltage test circuit over which the relay R310 is periodically bridged across the bus conductors 12a and 13a under the control of the cam-actuated springs 218. At its contacts 231, the relay R230 locks up in a circuit including the contacts 301 and completes a locking circuit for the switching relay R265. The relay R265, upon operating, closes its contacts 266 to connect the input terminals of the rectifier 10a to the alternating current feeder circuit, and closes its contacts 267 to connect the output terminals of the rectifier to the terminals of the storage battery 30a. Thus the charging operation is initiated.

During the revolution of the cams 206 to 211, inclusive, which next succeeds the relay operations just described, the cam-follower portion 218a of the upper contact spring 218 drops into the depression 211a, whereby the contact springs 217 are engaged to complete the prepared operating circuit for the alarm relay R240, this circuit extending from the positive conductor 12a by way of the contact springs 217, the contacts 233 and the winding of R240 to the negative conductor 13a. When thus energized the relay R240 operates and locks up in a circuit which extends from the positive conductor 12a by way of the contacts 325 and 243 and the winding of R240 to the negative conductor 13a. At its contacts 241, the relay R240 prepares the above-mentioned path for impressing ground potential upon the supervisory lead 273. At its contacts 242, the relay R240 prepares a locking circuit for the start charging relay R245. Shortly following the operation of the alarm relay R240 the cam-follower portion 214a of the upper contact spring 214 again drops into the depression 208a to start another low voltage test period. In this regard it may be pointed out that immediately the rectifier 10a is sarted the system voltage should rise to a value exceeding 46 volts. Accordingly the low voltage test relay R225 normally operates to open its contacts 226 and thus interrupt the operating circuit for the start charging relay R245 during the low voltage test period next succeeding the operation of the alarm relay R240. If, however, an extremely heavy load is imposed upon the system such that the system voltage fails to rise to a value above 46 volts during the interval which elapses between the operation of the relay R240 and the next low voltage test period, the relay R225 fails to operate at the beginning of this period and accordingly the above-traced operating circuit for the start charging relay R245 is completed during the last half of the period. In operating, the relay R245 closes its contacts to complete the prepared locking circuit for itself, this circuit extending from the positive conductor 12a by way of the contacts 241, 242 and 226 and the winding of R245 to the negative conductor 13a. At its contacts 248, the relay R240 again completes the above-traced operating circuits for the two relays R230 and R265. At its contacts 246 the relay R240 completes the path for impressing ground potential upon the supervisory lead 273. When this lead is grounded the associated alarm signaling equipment, not shown, assumes a setting for transmitting to a calling supervisory operator a signal which indicates that the system voltage is low. It will be apparent from the preceding explanation that when the system voltage ultimately rises to a value exceeding 46 volts the low voltage test relay R225 operates and opens its contacts 226 to interrupt the above-traced locking circuit for the start charging relay R245. Accordingly the latter relay is caused to release and in so doing opens its contacts 247 further to interrupt its own locking circuit. At its contacts 246, the relay R245 disconnects the supervisory lead 273 from ground, whereby the alarm signaling circuits are restored to normal, in which condition they are set to transmit a signal to a distant supervisory operator's position indicating that the system voltage is normal. At its contacts 248, the relay R245, in releasing, interrupts the above-traced operating circuits for the two relays R230 and R265, but the latter relays are held operated over their locking circuits as traced above.

With the rectifier 10a in operation, charging current is passed through the battery 30a so that ultimately the voltage across the terminals of this battery, and hence the system voltage, will rise to a value exceeding 52 volts. When this occurs the high voltage test relay is sufficiently energized over the periodically completed high voltage test circuit to operate. This test circuit may be traced as extending from the positive conductor 12a by way of the periodically engaged contact springs 218, the contacts 234 and the winding of R310 to the negative conductor 13a. In operating, the relay R310 closes its contacts 311 to complete a circuit including the contacts 321 for energizing the control relay R330. The relay R330 now operates and closes its contacts 332 to complete a path for short-circuiting the lower winding of the transfer relay R320, this path extending from the positive conductor 12a by way of the contacts 311, 321 and 332, the lower winding of R320 and the contacts 252 back to the positive conductor 12a. At the end of the high voltage test period in progress the contact springs 218 are disengaged to cause the deenergization and release of the high voltage test relay R320. This relay, upon restoring, opens its contacts 311 to interrupt the above-traced short-circuiting path and thus permit the lower winding of the relay R320 to be energized in series with the winding of the relay R330 over a circuit which extends from the positive conductor 12a by way of the contacts 252, the lower winding of R320, the contacts 332 and the winding of R330 to the negative conductor 13a. The current traversing this circuit is sufficient to maintain the relay R330 operated and to cause the operation of the transfer relay R320. In operating, the relay R320 opens its contacts 325 to interrupt the locking circuit for the relay R240 and thus cause the deenergization and release of the latter relay. At its contacts 321, the relay R320 further interrupts the above-traced operating circuit for the relay R330 and the path for short-circuiting its own lower winding. At its contacts 322, the relay R320 prepares the operating circuit for the stop charging relay R300. At its contacts 323, the relay R320 opens a point in the above-traced operating circuits for the two relays R230 and R265. At its contacts 324, the relay R320 prepares a circuit for energizing its own upper winding.

As indicated above, the relay R330, in operating, closes its contacts 331 to complete the operating circuit for the counter cell switching relay R340. The relay R340, upon operating, opens its contacts 341 to interrupt the path short-circuiting the counter cells 31a and thus include these cells in the connection between the positive terminal of the battery 30a and the positive bus conductor 12a. Thus the system voltage, i. e., that impressed upon the load and upon the high and low voltage test circuits, is decreased to a value substantially 4 volts less than the voltage across the terminals of the battery 30a. This decrease in the system voltage prevents the high voltage test relay R310 from operating during the high voltage test periods which immediately follow the relay operations just described. It will be understood, however, that since the system voltage exceeds 48 volts even following the operation of the counter cell switching relay R340, the low voltage test relay R225 periodically operates to prevent the operation of the start charging relay R245 during the last half of each low voltage test period. It will also be understood that the alarm relay R240 is energized for a short period during each revolution of the cam 211. The periodic operation of the latter relay is without effect, however.

If, following the operation of the counter cell switching relay R340 in the manner pointed out above, the peak traffic period of the day starts, such that a sustained heavy load is imposed upon the system, the system voltage may drop to a value less than 46 volts. Accordingly the low voltage test relay R225 will fail to operate at the beginning of the low voltage test period which first occurs after the drop in the system voltage. As a result, the start charging relay R245 is energized and operates during the last half of his test period. In operating, the relay R245 closes its contacts 248 to complete the prepared circuit for energizing the upper winding of the relay R320 in parallel with the winding of the release relay R250. This circuit extends from the positive conductor 12a by way of the contacts 248 and 324, and the parallel-connected windings of R320 and R250 to the negative conductor 13a.

When thus energized the relay R250 opens its contacts 251 further to interrupt the operating circuits for the relays R230 and R265. At its contacts 252, the relay R250 interrupts the previously traced circuit for energizing the lower winding of R320 in series with the winding of the relay R330. When thus deenergized the relay R330 opens its contacts 332 further to interrupt the series circuit extending through its own winding and the lower winding of the relay R320. At its contacts 331, the relay R330 opens the operating circuit for the relay R340. The relay R340 now restores and closes its contacts 341 to short-circuit the counter cells 31a, thus equalizing the system voltage and the voltage of the storage battery 30a. Shortly following the release of the two relays R330 and R340 the cam-controlled contact springs 215 are disengaged to cause the deenergization and release of the start charging relay R245. This relay, in restoring, opens its contacts 248 to interrupt the above-traced circuit for energizing the relay R250 in parallel with the upper winding of the relay R320. Thus the two relays R250 and R320 are caused to restore. From the above explanation it will be apparent that when a heavy load is imposed upon the system at a time when the counter cells 31a are included in the connection between the positive bus conductor 12a and the positive terminal of the battery 30a, these counter cells are short-circuited to increase the system voltage so that it equals the voltage across the battery 30a, and the operation of the rectifier 10a is not arrested. When the load imposed on the system is subsequently decreased, the system voltage will ultimately rise to a value exceeding 52 volts, whereby the high voltage test relay R310 is again sufficiently energized to operate. When this occurs the three relays R330, R340 and R320 are caused to operate in the exact manner described above so that the counter cells 31a are again included in the positive connection between the battery 30a and the bus conductor 12a.

With the counter cells 31a included in the positive connection between the battery 30a and the bus conductor 12a, and the rectifier 10a in operation, the system voltage will ultimately rise to a value exceeding 52 volts. When this occurs, the high voltage test relay R310 operates and closes its contacts 311 to complete the prepared circuit for energizing the stop charging relay R300, this circuit extending from the positive conductor 12a by way of the contacts 311 and 322, the winding of R300 and the contacts 347 to the negative conductor 13a. When thus energized the relay R300 opens its contacts 301 to interrupt the previously traced locking circuits for the two relays R230 and R265, causing both of these relays to restore. At the end of the high voltage test period in progress, the relay R310 and the stop charging relay R300 are sequentially deenergized in an obvious manner. The relay R230, upon restoring, opens its contacts 231 further to interrupt the locking circuit for itself and the switching relay R265. At its contacts 232 and 233, the relay R230 opens the prepared operating circuits for the alarm relays R235 and R240. At its contacts 234, the relay R230 opens the high voltage test circuit to prevent further operation of the relay R310. The switching relay R265, in releasing, opens its contacts 266 and 267 to interrupt the input and output circuits of the rectifier 10a. Thus the charging operation is arrested.

It will be noted that the charging circuit is opened without releasing the three relays R320, R330 and R340 to exclude the counter cells 31a from the positive connection between the storage battery 30a and the positive bus conductor 12a. The purpose of this arrangement is to prevent a relatively high system voltage at the end of each charging operation. Thus it will be apparent from the above explanation that at the end of the charging operation the voltage of the battery 30a is slightly in excess of 56 volts, which is substantially above the normal system voltage. If an appreciable load current is delivered to the load 40a from the storage battery 30a after the charging circuit is opened, the voltage of the battery 30a quickly drops to its normal value which ranges from 48 to 50 volts. This, of course, means that during a low voltage test period occurring shortly after the charging circuit is opened, the low voltage test relay R225 will fail to operate. Accordingly, the start charging relay R245 is energized and operates during the last half of the low voltage test period. In operating, the relay R245 completes the previously traced circuit for energizing the relay R250 in parallel with the upper winding of the relay R320, whereby the two relays R330 and R340 are caused sequentially to restore in the manner previously explained. At the end of the low voltage test period, the three relays R245, R250 and R320 are caused to restore in the manner described above. Following the release of these relays the system is fully restored to normal.

The manner in which the battery 30a is subjected to an equalizing charge at regular intervals is substantially the same as described above with reference to the system illustrated in Figs. 1 and 1A. Thus when the equalizing charge control key 345 is operated to its off-normal position, the contacts 347 are disengaged to open the operating circuit for the stop charging relay R300, and the contacts 346 are moved into engagement to complete an alternative circuit for energizing the two relays R230 and R265 in parallel. This alternative circuit extends from the positive conductor 12a by way of the contacts 301 and 346, and the parallel-connected windings of the relays R230 and R265 to the negative conductor 13a. When thus energized the two indicated relays both operate, assuming that they are not already in their operated positions. In operating, the switch relay R265 closes the input and output circuits of the rectifier 10a to complete the charging circuit and the locking relay R230 performs the functions described above. Concurrently with the operation of the key 345 to start the equalizing charge, the switch 350 is operated to open the path normally short-circuiting the counter cells 32a so that these counter cells are serially included in the positive connection between the battery 30a and the bus conductor 12a. The system voltage is accordingly dropped to a value substantially 4 volts less than the voltage of the battery 30a. Following the operation of the key 345 and the switch 350, the high and low voltage test relays and the counter cell switching relays are free to operate in the exact manner described above, the only difference being that with the contacts 347 disengaged the stop charging relay R300 cannot be energized in response to a subsequent operation of the high voltage test relay R310. It will be understood, however, that when the key 345 is manually restored to normal to open the contacts 346 and close the contacts 347, the stop charging relay R300 is immediately rendered operative under the control of the high voltage test relay R310 to cause the deenergization and release of the two relays R230 and R265, whereby the operation of the rectifier 10a is arrested. Preferably the switch 350 is held open for a short period after the key 345 has been released to cause the interruption of the charging circuit. If this procedure is followed, the system voltage, i. e., that appearing across the bus conductors 12a and 13a, is prevented from rising to an unduly high value due to the highly charged condition of the battery 30a. In this regard it will be understood that after the battery 30 has been subjected to a load for a short time interval the voltage thereof is rapidly reduced to normal, so that the switch 350 may be closed to short-circuit the counter cells 32a without causing an objectionable rise in the voltage across the bus conductors 12a and 13a.

As indicated previously, the counter cell 33, which is normally short-circuited through the contacts of the switch 351, is provided to change the high voltage charge cut-off point in accordance with variations in the characteristics of the battery 30a occasioned by seasonal changes in the temperature thereof. More specifically, the counter cell 33 is short-circuited through the contacts of the switch 351 during the summer months when the temperature of the battery 30a is relatively high and a relatively low charging voltage is sufficient fully to charge the battery 30a. On the other hand, during the winter months when a high charging voltage is required to bring the specific gravity of the battery 30a up to normal during each charging operation, the switch 351 is maintained in its open-circuit position so that the counter cell 33 is serially included in the positive connection between the battery 30a and the bus conductor 12a. It will be observed that with the counter cell 33 included in this connection the system voltage is at all times maintained at least 2 volts lower than the voltage of the battery 30a. This, of course, means that the low voltage test relay R225 will operate at a higher battery voltage than with the counter cell 33 short-circuited and also that the operation of the rectifier 10a will not be terminated until the battery voltage is increased to a value 2 volts higher than with the counter cell short-circuited. The use of the counter cell 33 in this manner also prevents the average system voltage from being higher during one season of the year, i. e., the winter months, than during the hot weather season of the year.

As indicated above, the three relays R220, R255 and R260 constitute an automatic reclosing circuit breaker arrangement which functions to protect the rectifier 10a against high voltage surges appearing across the input terminals thereof. More specifically, the relay R255 is a marginal alternating current relay and is adjusted to operate only when the voltage impressed across its winding substantially exceeds the voltage normally impressed across the input terminals 11a. In explaining the operation of these relays it may be assumed that a high voltage surge of short duration appears across the input terminals 11a at a time when the rectifier 10a is in operation, so that the relay R255 is energized thereby. Immediately the high voltage surge occurs, the relay R255 operates and opens its contacts 257 and 258 to interrupt both the input and output circuits of the rectifier 10a. In this regard it may be pointed out that the output circuit of the rectifier 10a is in all cases interrupted substantially concurrently with the opening of the input circuit thereto in order to protect the rectifier against flash-backs from the battery 30a. In operating, the relay R255 also closes its contacts 256 to prepare the operating circuit for the relay R220. Assuming that the high voltage impressed across the terminals 11a continues for a reasonable time interval the cam-follower portion 213a of the upper contact spring 213 drops into the depression 207a of the cam 207 so that the contact springs 213 are engaged to complete the prepared operating circuit for the relay R220. This circuit extends from the positive conductor 12a by way of the contacts 256, the contact springs 213 and the winding of R220 to the negative conductor 13a. When thus energized the relay R220 locks up in a circuit including the contacts 227 and 256 so that it remains operated after the contact springs 213 are disengaged by the cam 207. At its contacts 221, the relay R220 prepares the operating circuit for the relay R260. This circuit is completed at the contact springs 212 shortly following the operation of the relay R220. Thus when the cam-follower portion 212a of the upper contact springs 212 drops into the depression 206a, the contact springs 212 are engaged to energize the relay R260 over a circuit which extends from the positive conductor 12a by way of the contact springs 212, the contacts 221 and the winding of R260 to the negative conductor 13a. In operating, the relay R260 opens the path over which the winding of the marginal relay R255 is bridged across the input circuit supply terminals 11a. The relay R255 is thus deenergized and restores. At its contacts 256, the relay R255 opens the operating and locking circuits for the relay R220 causing the latter relay to release. At its contacts 257 and 258, the relay R255 reprepares the input and output circuits of the rectifier 10a. The relay R220, in releasing, opens the operating circuit for the relay R260. The relay R260 now restores to recomplete the input circuit of the rectifier 10a and to again bridge the winding of the relay R255 across the current supply terminals 11a. If the high voltage surge across the terminals 11a expires during the period required for the relay operation just described, the three relays R255, R220 and R260 remain in their restored positions. If, on the other hand, the high voltage across the current supply terminals 11a still persists, the relay R255 immediately reoperates to perform the operations described above. From this point on the above described sequence of relay operations, involving the three relays R220, R255 and R260, is periodically repeated under the control of the interrupter 105a until the high voltage condition is cleared. In this regard it will be apparent that the sequence of these operations is such that the input side of the rectifier 10a is only exposed to the high voltage for exceedingly short time intervals, insufficient to cause any damage to the rectifier.

As indicated above, the relay R270, operating in conjunction with the alarm relay R235, functions to control the alarm sending equipment, not shown, in a manner such that an alarm is transmitted to a supervisory operator's position in a distant central exchange if for any reason the rectifier 10a should fail to operate. Thus it will be understood from the preceding explanation that during normal operation of the rectifier to deliver current to the storage battery 30a and the load 40a in parallel, the relay R270 is energized and remains in its operated position. With this relay operated, the operating circuit for the alarm relay R235 is held open at the contacts 271. On the other hand, when the rectifier 10a is not in operation, the operating circuit for the alarm relay R235 is held open at the contacts 232 of the restored locking relay R230. If, however, the two relays R230 and R265 are operated so that the rectifier 10a is connected to deliver current to the storage battery 30a and the load 40a and no current traverses the connection between the output terminals of the rectifier and the terminals of the storage battery, the relay R270 remains in its restored position or releases, as the case may be, further to prepare the operating circuit for the alarm relay R235. If this condition prevails for a sustained time interval the operating circuit for the relay R235 is completed. More specifically, the circuit for energizing the relay R235 is completed when the cam-follower portion 216a of the upper contact spring 216 drops into the depression 210a, this circuit extending from the positive conductor 12a by way of the contacts 271, the contact springs 216, the contacts 232 and the lower winding of R235 to the negative conductor 13a. In operating, the relay R235 prepares or completes a locking circuit for itself depending upon the position of the transfer relay R320. This circuit extends from the positive conductor 12a by way of the contacts 325 and 237, and the upper winding of R235 to the negative conductor 13a. It will be apparent, therefore, that if the relay R320 is operated, the circuit just traced is only prepared, whereas if the relay R320 is restored the circuit is completed. Assuming that the relay R235 is energized over its circuit, it remains in its operated position wherein the contacts 236 are closed to impress ground potential upon the alarm lead 274. With this lead grounded for a sustained time interval an alarm signal is transmitted to the distant supervisory operator's position in the manner explained above with reference to the alarm repeater forming a part of the system illustrated in Figs. 1 and 1A of the drawings. If the relay R320 is operated, the transmission of the alarm signal is delayed until the voltage of the battery 30a drops to normal to cause the release of the three relays R320, R330 and R340 in the manner explained above. During this period the relay R235 is periodically energized for short time intervals over its operating circuit as traced above and functions to impress ground pulses upon the alarm lead 274. These ground pulses are of insufficient duration to cause the transmission of an alarm signal to the distant supervisory operator's position. It may occur that the fault responsible for the release of the relay R270 or the failure of this relay to operate will automatically be cleared before the locking circuit for the alarm relay R235 is completed through the release of the transfer relay R320. In such case the relay R270 operates and opens its contacts 271 to interrupt the operating circuit for the alarm relay R235 and thus prevent further operation of the latter relay.

Referring now more particularly to Figs. 4 and 5 of the drawings, the system there illustrated comprises a storage battery 30b which is normally floated across the output terminals of a constant voltage rectifier 20. This rectifier has a full load current rating which is substantially less than the peak load demands of the system. A second constant current rectifier 10b is provided which is arranged to be switched into the current supply channel when the load current exceeds the current rating of the rectifier 20, and to be switched out of the supply channel when the current demand drops to a value slightly less than the current rating of the rectifier 20. Preferably each of the two rectifiers 10b and 20 is of the dry disk or thermionic type. The control of the constant current rectifier 10b, the control of the alarm circuits, and the control of the counter cell switching are effected through operation of a control circuit 400 which differs somewhat from the control circuits respectively included in the two embodiments of the invention considered above. Briefly described, this control circuit comprises a pair of switching relays R410 and R430, an alarm relay R420, a pair of switching control relays R440 and R450, a marginal current responsive relay R460, a control relay R470, a low voltage test relay R480, a release relay R520, a transfer relay R530, a high voltage test relay R540, a control relay R550 and a counter cell switching relay R560. These relays are arranged to be controlled by the cam-actuated contact springs 510 to 513, inclusive, embodied in the constantly operating motor-driven interrupter 105b.

In considering the operation of the system shown in Figs. 4 and 5, it may be assumed that the normal voltage of the system battery is approximately 50 volts; the total load current rating of the system is from 5.5 to 6 amperes and that the rated full-load output current of the rectifier 20 is 3 amperes. It may also be assumed that the no-load voltage rating of the constant voltage rectifier 20 is approximately 51.5 volts. The low voltage test relay is adjusted to operate on any voltage above 48 volts and to fail to operate when energized with a voltage of lesser value, and the high voltage test relay R540 is arranged to operate on any voltage over 53 volts. Under the conditions assumed the constant current rectifier 10b should be adjusted to deliver about 75% of the rated output current of the constant voltage rectifier 20, i. e., a constant current of 2.25 amperes should be delivered from the rectifier 10b to the load 40b and the storage battery 30b in parallel, regardless of the load resistance, when this rectifier is connected in parallel with the constant voltage rectifier 20. Under normal light-load conditions the constant current rectifier 10b is disconnected from the current supply channel so that current is supplied to the battery 30b and the load 40b only from the constant voltage rectifier 20. With the system in this condition the continuously operated interrupter 105b functions periodically to prepare the operating circuit for the slow-to-release switching control relay R450. This circuit is only completed when the marginal current responsive relay R460 operates. Under the conditions assumed above the relay R460 should be constructed and adjusted to operate when traversed by current of approximately 2.7 amperes and, having operated, to release only when the current flow therethrough is decreased below a value of approximately 0.2 ampere. Marginal current responsive relays of this character having an exceedingly low winding resistance are commercially available. Assuming that the load demands of the system exceed 2.7 amperes, the relay R460 operates and closes its contacts 461 to prepare the operating circuit for the relay R450. This circuit is thereafter completed when the cam-follower portion 512a of the upper contact springs 512 drops into the depression 508a of the cam 508. More specifically, this circuit extends from the positive conductor 12b by way of the contact springs 512, the contacts 442 and 461 and the winding of R450 to the negative conductor 13b. This circuit is obviously opened at the contact springs 512 when the cam-follower portion 512a of the upper contact springs 512 is moved out of the depression 508a. The relay R450, in operating, closes its contacts 451 to complete an obvious circuit for energizing the switching relay R410. At its contacts 452, the relay R450 momentarily short-circuits the relay R440 over a path which includes the contacts 442 and the contact springs 512. This path is interrupted at the contact springs 512 when these springs are disengaged by the cam 508, permitting the two relays R440 and R450 to be energized in series over a circuit which includes the contacts 452 and 461. The current flow over this series circuit is sufficient to maintain the relay R450 operated and to cause the operation of the relay R440. In operating, the relay R440 closes its contacts 441 to complete an obvious circuit for energizing the switching relay R430. It will be observed that an interval substantially equal to the period required for the cam 508 to close and then open the contact springs 512 separates the operation of the switching relay R410 and the operation of the switching relay R430. In this regard it will be noted that the relay R410, in operating, closes its contacts 411 to complete the input circuit for the constant current rectifier 10b, and the relay R430, in operating, closes its contacts 431 to connect the output terminals of the rectifier 10b to the terminals of the storage battery 30b. The purpose of this arrangement is to insure complete operation of the rectifier 10b before a load is imposed thereon, whereby flash-backs through the rectifier are prevented, assuming this rectifier to be of the thermionic type. The relay R440, in operating, also opens its contacts 442 further to interrupt the above-traced operating circuit for the relay R450 and to prevent the short-circuiting of its own winding during subsequent operation of the interrupter 105b periodically to close the contact springs 512.

Immediately the relay R430 operates, the major portion of the load is shifted to the constant current rectifier 10b. Thus if the load current is increased to a value of 3.5 amperes, 2.25 amperes of this load is assumed by the rectifier 10b and the remaining 1.25 amperes is supplied by the constant voltage rectifier 20. As additional load is imposed upon the system, the increased load current is supplied by the constant voltage rectifier 20 until a point is reached wherein both of the rectifiers are supplying currents equal to their full-load ratings. Any additional load current is supplied by the storage battery 30b.

The two rectifiers 10b and 20 are operated in parallel until the load current supplied by these rectifiers drops to a value below 2.45 amperes, at which time the current traversing the winding of the relay R460 is less than 0.2 ampere. When this occurs the relay R460 releases and opens its contacts 461 to deenergize the series-connected relays R440 and R450. The relay R440 immediately restores and opens its contacts 441 to deenergize the relay R430. The relay R430, upon restoring, opens its contacts 431 to interrupt the circuit between the output terminals of the rectifier 10b and the storage battery 30b. Shortly following the release of the relay R430, the relay R450 restores and opens its contacts 451 to deenergize the switching relay R410. At its contacts 452, the relay R450 further interrupts the series holding circuit for itself and the relay R440. The relay R410, in releasing, opens its contacts 411 to interrupt the input circuit of the rectifier 10b. It will be observed that in this sequence of relay operations the output circuit of the rectifier 10b is opened a short interval before the input circuit of the rectifier is broken, thus preventing any possibility of a flash-back through the rectifier. The manner in which the five relays R410, R430, R440, R450 and R460 respond to additional changes in the system load is exactly the same as described above.

If for any reason the system voltage drops to a value below 48 volts the control circuit 400 operates to condition the associated supervisory or alarm signaling equipment to transmit a signal indicative of the low voltage condition. Thus during each rotation of the interrupter cams an obvious circuit through the contact springs 511 is completed for energizing the low voltage test relay R480. As long as the voltage exceeds 48 volts the relay R480 operates each time it is energized in this circuit and opens its contacts 481 to prevent the operation of the relay R470 during the last half of the low voltage test period. When, however, the system voltage drops to a value less than 48 volts, the relay R480 is insufficiently energized to operate. Accordingly, a circuit including the contacts 481 and the contact springs 510 is completed for energizing the relay R470 during the last half of the low voltage test period in progress. When thus energized the relay R470 operates and closes its contacts 471 to complete a locking circuit for itself which extends from the positive conductor 12b by way of the contacts 533, 471 and 481, and the winding of R470 to the negative conductor 13b. The completion of this circuit prevents the relay R470 from releasing when the low voltage test period in progress is terminated through disengagement of the contact springs 510. At its contacts 472, the relay R470 completes a path including the contacts 532 for impressing ground potential upon the supervisory lead 475. When this lead is grounded the supervisory or alarm signaling equipment to which it extends is conditioned to transmit a signal indicative of the low voltage condition to a supervisory operator's position located in a distant exchange, all in the manner described above with reference to the system shown in Figs. 1 and 1A of the drawings. If the low voltage condition should terminate, the relay R480 is again sufficiently energized to operate when the contact springs 511 are closed by the cam 507. In operating this relay R480 opens its contacts 481 to interrupt the locking circuit for the relay R470. The relay R470 accordingly releases and opens its contacts 472 to disconnect the supervisory lead 475 from ground. At its contacts 471, the relay R470 further interrupts its own locking circuit.

In the event the constant voltage rectifier 20 should fail, the alarm relay R420 associated therewith is deenergized in a well-known manner understood in the art. More specifically, this relay derives its energizing current from a winding of the input transformer included in the rectifier 20 so that if the commercial current source should fail or the input circuit of the rectifier should become open-circuited, the relay R420 is deenergized and restores. In releasing, this relay closes its contacts 421 to impress ground potential upon the alarm lead 474. This lead extends to an alarm repeater of the character illustrated in Fig. 1 of the drawings, and when connected to ground causes the repeater to transmit an alarm to the distant supervisory operator's position, all in the manner outlined above with reference to the alarm repeater forming a part of the system shown in Figs. 1 and 1A.

The counter cell switching control apparatus is used primarily during those periods when the battery 30b is being subjected to an equalizing charge. In this regard it is noted that the constant voltage rectifier 20 is, in accordance with well-known practice, equipped with a voltage control switch which, when operated, increases the output voltage of the rectifier from the normal value of 51.5 volts to a voltage of approximately 56 volts. Accordingly, when this switch is operated to start the equalizing charge, the system voltage is immediately increased to a value of 56 volts. When the cam 509 operates to permit engagement of the contact springs 513, following operation of the equalizing charge control switch embodied in the rectifier 20, the high voltage test relay R450 is energized by a voltage sufficient to cause the operation thereof. The circuit over which this relay is energized extends from the positive conductor 12b by way of the contact springs 513, the contacts 534 and the winding of R540 to the negative conductor 13b. In operating, the relay R540 closes its contacts 541 to complete an obvious circuit for energizing the relay R550. The relay R550 now operates and closes its contacts 551 to complete an obvious circuit for energizing the counter cell switching relay R560. At its contacts 552, the relay R550 completes a path including the contacts 521 and 541 for short-circuiting the lower winding of the transfer relay R530. This path is interrupted at the contacts 541 when the high voltage test relay R540 restores at the end of the high voltage test period in progress. When this path is opened, the lower winding of the relay R530 is energized in series with the winding of the relay R550 over a circuit which includes the contacts 521 and 552. The current traversing this circuit is sufficient to maintain the relay R550 operated and to cause the operation of the transfer relay R530. The relay R530, in operating, closes its contacts 531 to prepare a circuit for energizing its upper winding in series with the release relay R520. At its contacts 532, the relay R530 opens a point in the above-traced path for impressing ground potential upon the supervisory lead 475. At its contacts 533, the relay R530 opens a point in the above-traced locking circuit for the relay R470. At its contacts 534, the relay R530 opens the high voltage test circuit over which the relay R540 is periodically bridged across the bus conductors 12b and 13b by the interrupter 105b. The relay R560, in operating, opens its contacts 561 to interrupt the path normally short-circuiting the counter cells 31b. Thus the counter cells are serially included in the positive connection between the storage battery 30b and the bus conductor 12b so that the system voltage is decreased to a value approximately 4 volts less than the voltage of the battery 30b, i. e., to a value of approximately 52 volts. The three relays R530, R550 and R560 will normally remain operated throughout the equalizing charge period. When, however, the voltage control switch of the rectifier 20 is manually restored to normal to decrease the output voltage of this rectifier to its normal value of 51.5 volts, the voltage across the bus conductors 12b and 13b is decreased accordingly, i. e., to a value of 47.5 volts. Accordingly the low voltage test relay R480 will fail to operate and the relay R470 will operate shortly after the voltage control switch of the rectifier 20 is restored to normal. In operating, the relay R470 closes its contacts 473 to complete the prepared circuit for energizing the release relay R520 in series with the upper winding of the relay R530. The relay R520 now operates and opens its contacts 521 to deenergize the relay R550 and the lower winding of the relay 530. The relay 550 now restores and opens its contacts 552 further to interrupt the series locking circuit for itself and the relay R530. At its contacts 551, the relay R550 interrupts the operating circuit for the counter cell switching relay R560. Shortly following the release of the two relays R550 and R560 the low voltage test period in progress is terminated to cause the sequential release of the relays R470, R520 and R530, in a manner clearly apparent from the above explanation. The relay R560, in restoring, closes its contacts 561 to again short-circuit the counter cells 31b, whereby the full battery voltage is again impressed across the bus conductors 12b and 13b. Following the release of the relays R520 and R530 the voltage testing and counter cell switching equipment is fully restored to normal. It will be understood from the above explanation that in any case where the system voltage rises to an unusually high value the sequence of relay operations just described will occur to cause the counter cells 31b to be serially included in the positive connection between the battery 30b and the bus conductor 12b. It will also be understood that if the system voltage drops below 48 volts during an equalizing charge period, the relays R530, R550 and R560 will be released under the control of the low voltage test relay R480 and the relay R470 to exclude the counter cells 31b from the positive connection between the battery 30b and the conductor 12b, whereby the system voltage and the battery voltage are equalized.

From the preceding explanation it will be noted that in each of the three disclosed embodiments of the invention, the high and low voltage test circuits are only periodically completed. The purpose of this periodic testing arrangement is threefold. First, the periodic testing of the system voltage prevents the charging units from being prematurely started in response to sudden and momentary load surges which cause a momentary drop in the system voltage. Similarly, there is less likelihood of the high voltage test relays operating to cause premature counter cell switching or premature interruption of the charging circuits in response to momentary decreases in the load imposed on the system. The second advantage of the periodic testing arrangement resides in the fact that these relays are not continuously subjected to voltage changes. Such continuous voltage changes tend to alter the characteristics of the test relays and, more specifically, to alter the voltage values at which these relays will operate and restore. With the arrangement illustrated, however, wherein the test relays are not continuously subjected to the system voltage but are only energized at widely spaced intervals of short duration, the alteration in the characteristics thereof is substantially minimized. Further, the periodic energization of the test relays prevents these relays from being substantially affected by vibration transmitted thereto from adjacent equipment.

It will also be noted that in each of the two embodiments in the invention disclosed in Figs. 1, 1A, 2 and 3 of the drawings, which utilize a constant current charging unit, a trickle charge is automatically imparted to the system battery at the end of each routine charging operation. In an actual installation it is desirable to provide a constant current charger having an ampere hour output approximately 25% above the average daily ampere hour consumption. For example, an exchange which normally consumes 96 ampere hours during each 24-hour period should be equipped with a charger set to deliver 5 amperes. In an exchange of this character, practically all of the current consumption occurs during 18 consecutive hours, extending from 6 A. M. until 12 o'clock midnight. This means that the average discharge rate during the 18-hour period is approximately 5 amperes. If a 5 ampere charging rate is used and the operation of the charging unit is started at about 8 A. M. when the busy hour normally starts, the charging unit is of insufficient capacity to carry the load, but as the load decreases until the exchange requirements are only about 4 amperes the 100 ampere hour battery will receive about one-twelfth of its rated charging current. Therefore it will be seen that the battery reaches its high point for the regular charge cut-off when it is charging at a very low rate. Because of this low charging rate a series resistance for providing a trickle charge near the end of the charging operation is not required. Also, because of the low charging rate, and because the battery is to have an equalizing charge approximately every thirty days, it is generally satisfactory to stop the daily charge at 2.375 volts per cell. The low charging rate also reduces the need for arresting the battery charge at a high voltage during winter months and at a low voltage during summer months. It will also be noted, with reference to each of the first two embodiments of the invention under consideration, that the above-described automatic control of the counter cell switching prevents the system from being subjected to an abnormally high voltage during the final portion of each charging period. In the arrangement illustrated in Figs. 4 and 5 of the drawings, wherein the constant voltage rectifier is utilized, trickle charge is also imparted to the system battery without the use of a trickle charge resistor. Thus as the battery 30b approaches a fully charged condition the internal voltage drop across the terminals thereof gradually rises with an accompanying decrease in the charging current traversing the battery.

While there have been described what are at present considered to be the preferred embodiments of the invention, it will be understood that various modifications may be made therein, and it is contemplated to cover in the appended claims all such modifications as fall within the true spirit and scope of the invention.

What is claimed is:

1. In a system for charging a battery, a charging circuit, a testing device, means for causing said testing device successively to test the voltage of said battery and a reference voltage which is less than the voltage of said battery by a substantially fixed amount, means operated by reason of the battery voltage decreasing to a predetermined value for closing said charging circuit, and means operated by reason of said reference voltage rising to a predetermined value for opening said charging circuit.

2. In a current supply system, a supply circuit, a battery and a source of counter E. M. F. serially included in a connection bridging said circuit, an electromagnetic voltage testing device, means for periodically connecting said testing device across said circuit, and means controlled by said testing device for excluding said source from said connection by reason of the voltage across said circuit decreasing to a predetermined value.

3. In a current supply system, a supply circuit, a battery included in a connection bridging said circuit, an electromagnetic voltage testing device, means for periodically connecting said testing device across said circuit, a source of counter E. M. F., and means controlled by said testing device for serially including said source in said connection by reason of the voltage across said circuit rising to a predetermined value.

4. In a current supply system, a supply circuit, a battery included in a connection bridging said circuit, electromagnetic voltage testing means, means for periodically connecting said voltage testing means across said circuit, means controlled by said voltage testing means for delivering charging current to said battery at spaced intervals, counter cells, and means controlled by said voltage testing means for including said counter cell in said connection only during the final portion of each period when charging current is delivered to said battery.

5. In a current supply system including a battery and a load, a connection between said battery and said load, means for delivering charging current to said battery for an interval, a source of counter E. M. F., means for automatically including said source in said connection during said charging interval, and means for automatically excluding said source from said connection upon the conclusion of said charging interval.

6. In a current supply system including a battery and a load, a connection between said battery and said load, means for intermittently delivering charging current to said battery, a source of counter E. M. F., means for automatically including said source in said connection only during the final portion of each interval when charging current is delivered to said battery, and means for automatically excluding said source from said connection upon the conclusion of each charging interval.

7. In a system for charging a battery, a charging circuit, a low voltage test relay, a normally incomplete low voltage test circuit for bridging said low voltage test relay across said battery, a high voltage test relay, a normally incomplete high voltage test circuit for bridging said high voltage test relay across said battery, a pulsing element operative periodically to complete said low voltage test circuit, switching means controlled by said low voltage test relay and operative to control said charging circuit and to prepare said high voltage test circuit, a separate pulsing element operative periodically to complete said high voltage test circuit following the operation of said switching means, and means controlled by said high voltage test relay for releasing said switching means.

8. In a system for charging a battery, a charging circuit, a switching relay operative to control said charging circuit, a normally incomplete operating circuit for said switching relay, a low voltage test relay operative to open said operating circuit, a normally incomplete low voltage test circuit for bridging said low voltage test relay across said battery, a pulsing element operative periodically to complete said low voltage test circuit, a second pulsing element operative to complete said operating circuit during the final portion of each period when said low voltage test circuit is completed, a high voltage test relay, a normally incomplete high voltage test circuit for bridging said high voltage test relay across said battery, means responsive to operation of said switching relay for preparing said high voltage test circuit, a third pulsing element operative periodically to complete said high voltage test circuit following the operation of said switching relay, and means controlled by said high voltage test relay for releasing said switching relay.

9. In a system for charging a battery, a charging circuit, a low voltage test relay, a normally incomplete low voltage test circuit for bridging said low voltage test relay across said battery, a high voltage test relay, a normally incomplete high voltage test circuit for bridging said high voltage test relay across said battery, a pulsing element operative periodically to complete said low voltage test circuit, a switching relay controlled by said low voltage test relay and operative to prepare said high voltage test circuit, means responsive to operation of said switching relay for completing said charging circuit, means for periodically completing said high voltage test circuit, a voltage dropping element, means responsive to the operation of said high voltage test relay for serially including said voltage dropping element in said high voltage test circuit, whereby said high voltage test relay is released and then reoperates as the charge delivered to said battery continues, and means responsive to the reoperation of said high voltage test relay for releasing said switching relay.

10. In a system for charging a battery, a charging circuit, a low voltage test relay, a normally incomplete low voltage test circuit for bridging said low voltage test relay across said battery, a high voltage test relay, a normally incomplete high voltage test circuit for bridging said high voltage test relay across said battery, a pulsing element operative periodically to complete said low voltage test circuit, a switching relay controlled by said low voltage test relay and operative to prepare said high voltage test circuit, means responsive to operation of said switching relay for completing said charging circuit, means for periodically completing said high voltage test circuit, a voltage dropping element, means responsive to the operation of said high voltage test relay for serially including said voltage dropping element in said high voltage test circuit, whereby said high voltage test relay is released and then reoperates as the charge delivered to said battery continues, means responsive to the reoperation of said high voltage test relay for releasing said switching relay, and means responsive to the subsequent operation of said switching relay for excluding said voltage dropping device from said high voltage test circuit.

11. In a system for charging a battery, a charging circuit, a switching relay operative to control said charging circuit, a normally incomplete operating circuit for said switching relay, a low voltage test relay operative to open said operating circuit, a normally incomplete low voltage test circuit for bridging said low voltage test relay across said battery, means operative periodically to complete said low voltage test circuit, and means operative to prepare said operating circuit during the final portion of each period when said low voltage test relay is completed, whereby said switching relay is energized when said low voltage test relay fails to operate.

12. In a system for supplying direct current to a load from an alternating current source, a rectifier operative to deliver current to the load at a substantially constant voltage regardless of the load, a second rectifier operative to deliver current of a substantially constant value to the load regardless of the load resistance, input and output terminals for said rectifiers, means controlled in accordance with the magnitude of the load current for connecting said input terminals in parallel, and means comprising a timing device for connecting said output circuits in parallel a predetermined time interval following the operation of said last-named means.

13. In a system for supplying direct current to a load from an alternating current source, a rectifier operative to deliver current to the load at a substantially constant voltage regardless of the load, a second rectifier operative to deliver current at a substantially constant value to the load regardless of the load resistance, said rectifiers including input and output circuits connected in parallel, means controlled in accordance with the magnitude of the load current for opening the output circuit of said second rectifier, and means comprising a timing device for opening the input circuit of said second rectifier a predetermined time interval following the operation of said last-named means.

14. In a system for supplying direct current to a load from an alternating current source, a rectifier operative to deliver current to the load at a substantially constant voltage regardless of the load, a second rectifier operative to deliver current at a substantially constant value to the load regardless of the load resistance, said second rectifier including an input circuit and an output circuit, means controlled in accordance with the magnitude of the load current for completing said input and output circuits when the load current exceeds a predetermined value and for opening said circuits when the load current falls below said predetermined value, and means comprising a timing device for delaying the completion of said output circuit for an interval following completion of said input circuit and for delaying the opening of said input circuit for an interval following the opening of said output circuit.

15. In a current supply system, an alternating current circuit, a storage battery, a circuit for charging said battery, an interrupter including a driving motor normally energized by current traversing said alternating current circuit, means controlled by said interrupter for completing said charging circuit each time the voltage of said battery falls below a predetermined value, means including a current inverter energized by current derived from said battery for sustaining the energization of said motor when said alternating current circuit is deenergized, a signaling circuit, and means responsive to the deenergization of said alternating current circuit for rendering said interrupter ineffective to cause the operation of said first-named means and for rendering said interrupter effective to transmit a signal over said signaling circuit which is indicative of the deenergized condition of said alternating current circuit.

16. In a current supply system, an alternating current circuit, a storage battery, a circuit for charging said battery, an interrupter including a driving motor normally energized by current traversing said alternating current circuit, means controlled by said interrupter for completing said charging circuit each time the voltage of said battery falls below a predetermined value, a signaling circuit, means controlled by said interrupter for normally impressing a signal voltage of one character on said signaling circuit, means including a current inverter energized by current derived from said battery for sustaining the energization of said motor when said alternating current circuit is deenergized, and means responsive to the deenergization of said alternating current circuit for rendering said interrupter ineffective to cause the operation of said first-named means and for rendering said interrupter effective to impress a signal voltage of different character on said signaling circuit.

17. In a battery charging system, a rectifier including an input circuit adapted to be connected to a source of alternating current and an output circuit adapted to be connected to the system battery, and an automatic reclosing circuit breaker including means for opening said input circuit when a high voltage is impressed on said input circuit, means for periodically testing said input circuit for said high voltage, and means for reclosing said input circuit when a test indicates that said high voltage has been removed from said input circuit.

CLARENCE E. LOMAX.
PIER BAKKER.